US012597120B2

(12) United States Patent
Yamashita et al.

(10) Patent No.: US 12,597,120 B2
(45) Date of Patent: Apr. 7, 2026

(54) PRINTED IMAGE DEFECT DISCRIMINATION DEVICE AND METHOD DISPLAYING DETECTED DEFECTS IN LIST BY TYPE IN DISPLAY MODE ACCORDING TO STATE OF DEFECT

(71) Applicant: SEIKO EPSON CORPORATION, Tokyo (JP)

(72) Inventors: Mitsuhiro Yamashita, Matsumoto (JP); Naoki Hagihara, Shiojiri (JP); Yuko Yamamoto, Shiojiri (JP); Takahiro Kamada, Matsumoto (JP); Takuya Ono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 397 days.

(21) Appl. No.: 18/178,722

(22) Filed: Mar. 6, 2023

(65) Prior Publication Data

US 2023/0281799 A1    Sep. 7, 2023

(30) Foreign Application Priority Data

Mar. 7, 2022    (JP) ................................. 2022-034355

(51) Int. Cl.
*G06T 7/00* (2017.01)
*H04N 1/00* (2006.01)

(52) U.S. Cl.
CPC ......... *G06T 7/001* (2013.01); *H04N 1/00015* (2013.01); *H04N 1/00045* (2013.01); *H04N 1/00068* (2013.01); *H04N 1/00074* (2013.01); *G06T 2207/20081* (2013.01); *G06T 2207/30144* (2013.01)

(58) Field of Classification Search
CPC .. H04N 1/00002–00092; G06T 7/0002; G06T 7/0004; G06T 7/001; G06T 2207/30144; G06T 2207/30164; G06T 2207/30176
See application file for complete search history.

(56) References Cited

U.S. PATENT DOCUMENTS 9,183,434 B2 * 11/2015 Muraishi ................... G06T 7/33
9,189,845 B2 * 11/2015 Sochi ....................... G06T 7/001
(Continued)

FOREIGN PATENT DOCUMENTS

JP      2017161352      9/2017
JP      2018093266      6/2018
(Continued)

*Primary Examiner* — Scott A Rogers
(74) *Attorney, Agent, or Firm* — WORKMAN NYDEGGER

(57) ABSTRACT

A defect discrimination device for printed image includes an inspection image acquisition section configured to acquire an inspection image by imaging a print medium on which an image is printed, the image corresponding to a reference image that becomes a reference of an image in which a defect is to be detected; a defect detection section configured to detect a state of the defect, the state including a defect type of the defect included in the printed inspection image; and a display section configured to display a display image corresponding to the inspection image, and an inspection result display section configured to display the detected defect together with the defect type of the defect, in a display mode according to the state of the defect.

7 Claims, 21 Drawing Sheets

(56) References Cited

U.S. PATENT DOCUMENTS

| | | | | |
|---|---|---|---|---|
| 9,317,914 | B2 * | 4/2016 | Kitai | H04N 1/00047 |
| 10,564,110 | B2 | 2/2020 | Yamazaki | |
| 10,810,721 | B2 * | 10/2020 | Mech | G06N 3/0464 |
| 11,303,762 | B2 * | 4/2022 | Takayama | G06T 7/0004 |
| 11,354,799 | B2 * | 6/2022 | Nakada | H04N 1/00005 |
| 11,386,538 | B2 * | 7/2022 | Yoshida | G06N 20/20 |
| 11,468,553 | B2 * | 10/2022 | Kulkarni | G06T 5/73 |
| 11,562,481 | B2 * | 1/2023 | Takahashi | G06K 15/408 |
| 11,580,630 | B2 * | 2/2023 | Soltwedel | B41J 2/2142 |
| 11,676,267 | B2 * | 6/2023 | Kashibuchi | G06K 15/1878 |
| | | | | 358/504 |
| 11,750,747 | B2 * | 9/2023 | Daiku | B41J 2/2135 |
| | | | | 358/1.1 |
| 11,838,454 | B2 * | 12/2023 | Daiku | H04N 1/0066 |
| 11,854,183 | B2 * | 12/2023 | Takahashi | G06T 7/001 |
| 11,908,126 | B2 * | 2/2024 | Soltwedel | G06T 7/001 |
| 11,985,288 | B2 * | 5/2024 | Nakada | H04N 1/00076 |
| 12,047,540 | B2 * | 7/2024 | Mikami | H04N 1/00087 |
| 12,209,972 | B2 | 1/2025 | Horita | |
| 12,256,046 | B2 * | 3/2025 | Haruta | G06T 7/337 |
| 12,322,079 | B2 | 6/2025 | Ikeda | |
| 2015/0221077 | A1 | 8/2015 | Kawabata et al. | |
| 2019/0003985 | A1 | 1/2019 | Yamazaki | |
| 2022/0277439 | A1 | 9/2022 | Ikeda | |
| 2023/0003663 | A1 | 1/2023 | Horita | |
| 2023/0281797 | A1 * | 9/2023 | Yamashita | G06T 7/001 |
| | | | | 382/112 |
| 2023/0386020 | A1 * | 11/2023 | Haruta | G06T 7/001 |
| 2024/0029238 | A1 * | 1/2024 | Daiku | G06T 7/11 |
| 2024/0119583 | A1 * | 4/2024 | Daiku | G06T 7/337 |
| 2024/0177296 | A1 * | 5/2024 | Iwano | G06V 10/24 |
| 2024/0296538 | A1 * | 9/2024 | Suda | H04N 1/00045 |
| 2025/0036901 | A1 * | 1/2025 | Haruta | G06T 7/001 |

FOREIGN PATENT DOCUMENTS

| | | |
|---|---|---|
| JP | 2021139769 | 9/2021 |
| WO | 2015/114833 A | 8/2015 |
| WO | 2021/010269 | 1/2021 |
| WO | 2021/199830 | 7/2021 |

* cited by examiner

KSp_ConvVN1

| LABEL/ CLASS $i$ | SPECIFIC LAYER $j$ | SUBREGION $k$ | DATA NUMBER $q$ | KNOWN FEATURE INFORMATION KSp | |
|---|---|---|---|---|---|
| 1 | 1 | 1 | 1 | · · · · · · · · · · · · · · · · · · · | $i=1$ $j=1$ $k=$ $1\sim144$ |
| ... | ... | ... | ... | · · · · · · · · · · · · · · · · · · · | |
| 1 | 1 | 1 | max1 | · · · · · · · · · · · · · · · · · · · | |
| ... | ... | ... | ... | · · · · · · · · · · · · · · · · · · · | |
| 1 | 1 | 144 | 1 | · · · · · · · · · · · · · · · · · · · | |
| ... | ... | ... | ... | · · · · · · · · · · · · · · · · · · · | |
| 1 | 1 | 144 | max1 | · · · · · · · · · · · · · · · · · · · | |
| 2 | 1 | 1 | 1 | · · · · · · · · · · · · · · · · · · · | $i=2$ $j=1$ $k=$ $1\sim144$ |
| ... | ... | ... | ... | · · · · · · · · · · · · · · · · · · · | |
| 2 | 1 | 1 | max2 | · · · · · · · · · · · · · · · · · · · | |
| ... | ... | ... | ... | · · · · · · · · · · · · · · · · · · · | |
| 2 | 1 | 144 | max2 | · · · · · · · · · · · · · · · · · · · | |

$\vdots$      $\vdots$      $\vdots$

| LABEL/ CLASS $i$ | SPECIFIC LAYER $j$ | SUBREGION $k$ | DATA NUMBER $q$ | KNOWN FEATURE INFORMATION KSp | |
|---|---|---|---|---|---|
| 8 | 1 | 1 | 1 | · · · · · · · · · · · · · · · · · · | $i=8$ $j=1$ $k=$ $1\sim144$ |
| ... | ... | ... | ... | · · · · · · · · · · · · · · · · · · | |
| 8 | 1 | 1 | max3 | · · · · · · · · · · · · · · · · · · | |
| ... | ... | ... | ... | · · · · · · · · · · · · · · · · · · | |
| 8 | 1 | 144 | 1 | · · · · · · · · · · · · · · · · · · | |
| ... | ... | ... | ... | · · · · · · · · · · · · · · · · · · | |
| 8 | 1 | 144 | max3 | · · · · · · · · · · · · · · · · · · | |

ConvVN1: J=1, k=1~144, q=1~max1
ConvVN2: J=2, k=1~9,   q=1~max2
ClassVN: J=3, k=1,      q=1~max3

FIG. 10

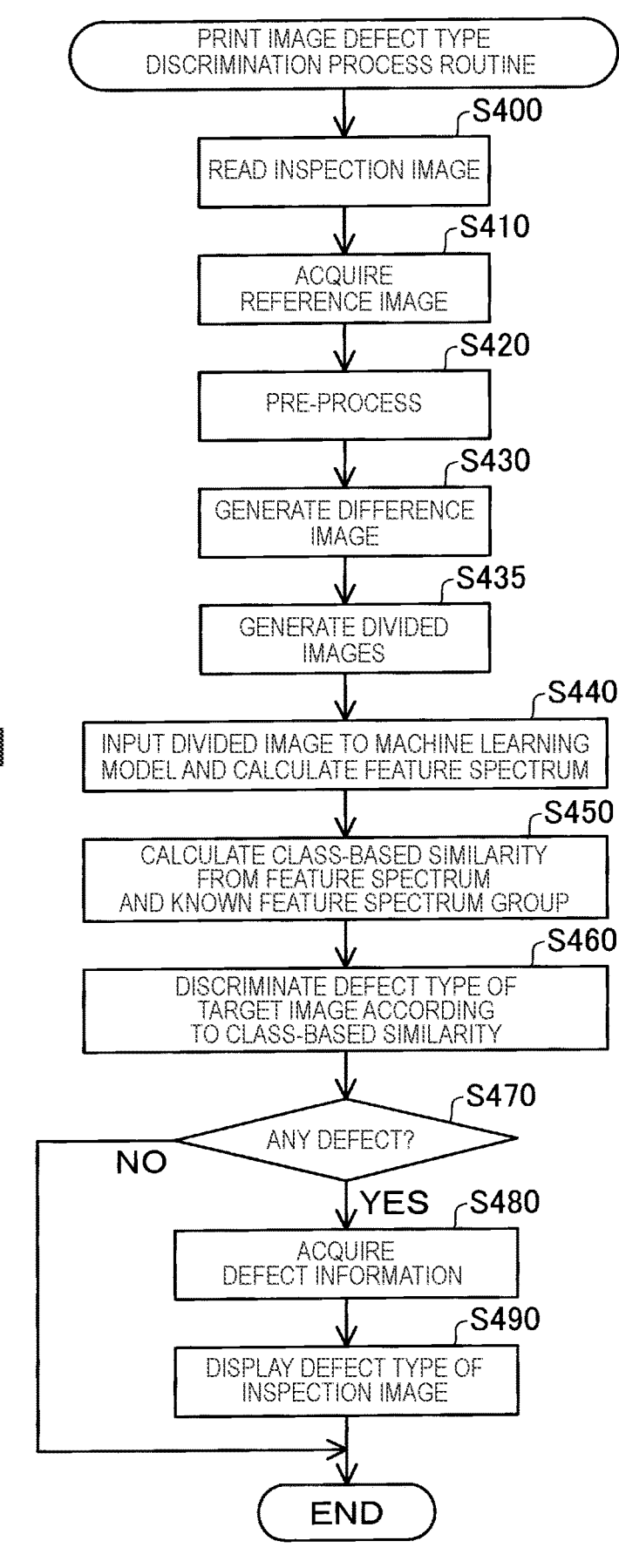

FIG. 11

PRINT IMAGE DEFECT TYPE
DISCRIMINATION PROCESS ROUTINE

S400
READ INSPECTION IMAGE

S410
ACQUIRE
REFERENCE IMAGE

S420
PRE-PROCESS

S430
GENERATE DIFFERENCE
IMAGE

S435
GENERATE DIVIDED
IMAGES

S440
INPUT DIVIDED IMAGE TO MACHINE LEARNING
MODEL AND CALCULATE FEATURE SPECTRUM

S450
CALCULATE CLASS-BASED SIMILARITY
FROM FEATURE SPECTRUM
AND KNOWN FEATURE SPECTRUM GROUP

S460
DISCRIMINATE DEFECT TYPE OF
TARGET IMAGE ACCORDING
TO CLASS-BASED SIMILARITY

S470
ANY DEFECT?
NO
YES S480
ACQUIRE
DEFECT INFORMATION

S490
DISPLAY DEFECT TYPE OF
INSPECTION IMAGE

END $$\text{Sclass}(i,j)=\max[G\{Sp(j,k=all),KSp(i,j,k=all,q=all)\}]$$

| SPECIFIC LAYER j | | j=1 ConvVN1 | j=2 ConvVN2 | j=3 ClassVN |
|---|---|---|---|---|
| CLASS i | 1 | 0.88 | 0.82 | 0.80 |
| | 2 | 0.90 | 0.89 | 0.98 |
| | 3 | 0.95 | 0.97 | 0.90 |
| | 4 | 0.78 | 0.53 | 0.63 |
| | 5 | 0.61 | 0.77 | 0.81 |
| | 6 | 0.56 | 0.62 | 0.88 |
| | 7 | 0.84 | 0.81 | 0.66 |
| | 8 | 0.76 | 0.49 | 0.89 |

$$\text{S\_value}(j)=\max\{(\text{Sclass}(i=all,j)\}$$

RD_ClassVN(D_class,S_value)
=(2,0.98)

RD_ConvVN2(D_class,S_value)=(3,0.97)

RD_ConvVN1(D_class,S_value)=(3,0.95)

FIG. 13

PRINTED IMAGE DEFECT DISCRIMINATION DEVICE AND METHOD DISPLAYING DETECTED DEFECTS IN LIST BY TYPE IN DISPLAY MODE ACCORDING TO STATE OF DEFECT

The present application is based on, and claims priority from JP Application Serial Number 2022-034355, filed Mar. 7, 2022, the disclosure of which is hereby incorporated by reference herein in its entirety.

BACKGROUND

1. Technical Field

The present disclosure relates to a defect discrimination device for a printed image and a defect discrimination method thereof.

2. Related Art

An image inspection device is disclosed in WO-A-2015/114833. This image inspection device generates difference display image data for each threshold value, and makes a visually check possible by displaying difference display positions in different display forms according to the difference display image data.

However, in the technique of WO-A-2015/114833, there is no mention of display switching according to a defect type, and there is a problem that it is difficult to understand what kind of defect occurs in what region of an image.

SUMMARY

The present disclosure can be realized as the following forms or application examples.

(1) A defect discrimination device for printed image according to one embodiment of the present disclosure includes an inspection image acquisition section configured to acquire an inspection image by imaging a print medium on which an image is printed, the image corresponding to a reference image that becomes a reference of an image in which a defect is to be detected; a defect detection section configured to detect a state of the defect, the state including a defect type of the defect included in the printed inspection image; and an inspection result display section configured to display the detected defect together with the defect type of the defect, in a display mode according to the state of the defect.

(2) A defect discrimination method for printed image according to another embodiment of the present disclosure includes step of acquiring an inspection image by imaging a print medium on which an image is printed, the image corresponding to a reference image that becomes a reference of an image in which a defect is to be detected; step of detecting a state of the defect, the state including a defect type of the defect included in the printed inspection image; and step of displaying the detected defect together with the defect type of the defect, in a display mode according to the state of the defect.

BRIEF DESCRIPTION OF THE DRAWINGS

FIG. 10 is an explanatory diagram showing a configuration of known feature information.

FIG. 11 is a flowchart showing the processing procedure of a defect discrimination device for a printed image.

FIG. 13 is an explanatory diagram showing an example of a calculation method for the class-based similarity.

DESCRIPTION OF EMBODIMENT

A. First Embodiment (1) System Configuration

Figure 1:
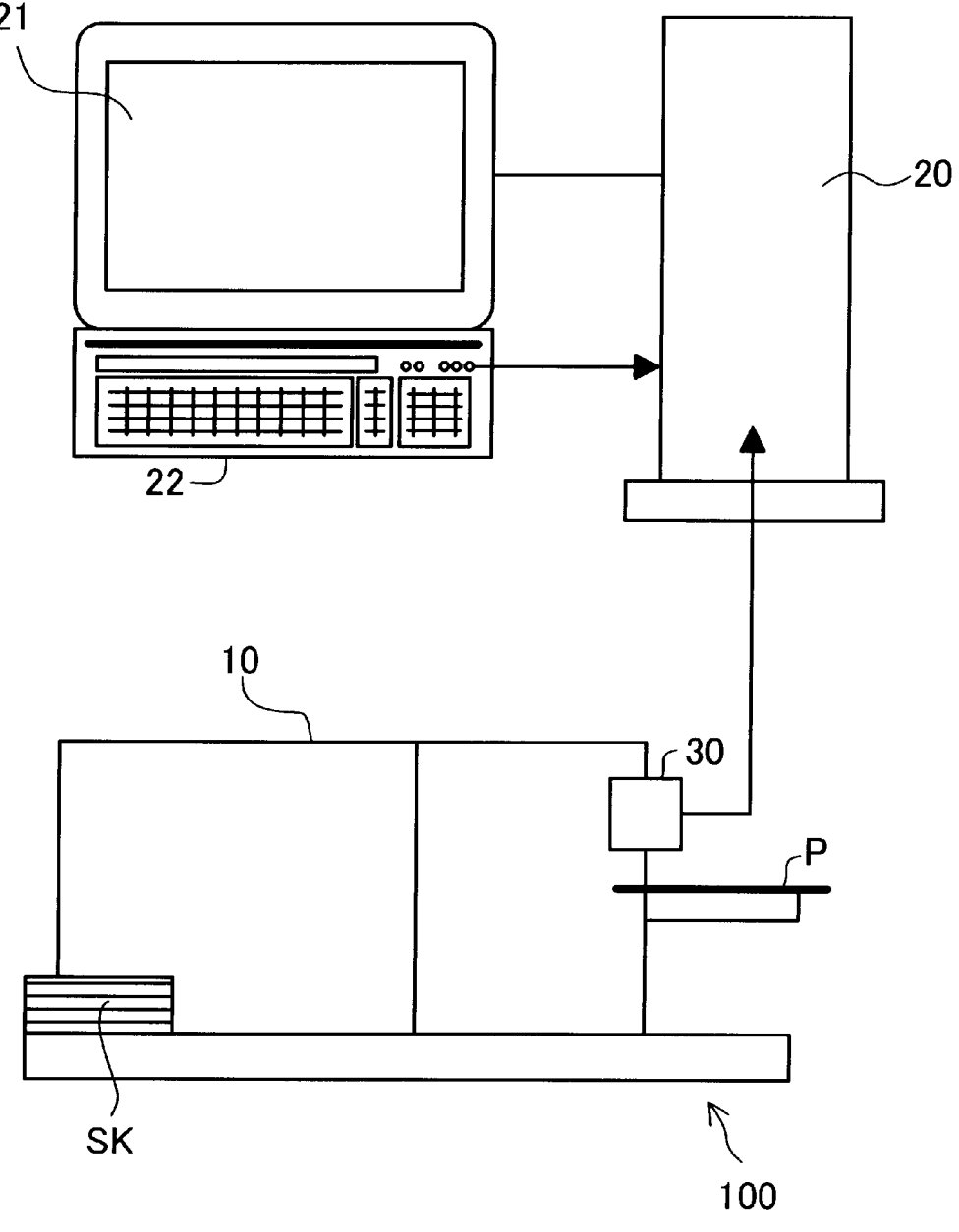
FIG. 1 is a block diagram of a class discrimination system according to an embodiment.

FIG. 1 is a block diagram showing a schematic configuration of a defect discrimination system 100 for inspection image according to an embodiment. The defect discrimination system 100 is a printing system including a printer 10, an information processing device 20, and a scanner 30 as an imaging section. The printer 10 receives data of an image to be printed from the information processing device 20 and prints the data on a print medium P. The method of image formation on the print medium P does not matter. Printing may be performed by, for example, an inkjet method in which ink droplets are ejected onto the print medium P, a xerographic method in which a latent image is formed on a photosensitive drum and toner is transferred onto the print medium P, or a planographic printing method in which a planographic plate or the like is prepared and ink is transferred. Among images output to and printed by the printer 10, an image that has no defect corresponds to a reference image, and an image printed on the print medium P and read by the scanner 30 corresponds to an inspection image. However, as will be described later, in the inspection, a process of calculating a difference between the reference image and the inspection image is performed, and thus the format of both images needs to be the same. For example, if an original image org to be printed is in an RGB format and a resolution r1, a print image prt to be actually printed on the print medium P is in CMYK format and a resolution r2, and an imaged image scg to be read by the scanner 30 is in the RGB format and a resolution r3, then the imaged image scg read by the scanner 30 is used as the inspection image, and the original image org converted to a resolution of resolution r3 is used as the reference image. Alternatively, the reference image may be prepared by reading, with the scanner 30, an image printed by the printer 10 in a state in which it is confirmed that no defect has occurred.

The scanner 30 is provided inside the printer 10 or at a position where the printed print medium P is discharged, and is capable of scanning the printing surface of the print medium P and capturing the inspection image. In the present disclosure, the inspection image obtained by the scanner 30 is used to generate a difference image by taking a difference from the reference image. The difference image is input to a machine learning model (to be described later). The information processing device 20 executes class discrimination process of a defect type by using the machine learning model, and discriminates to which of a plurality of classes the defect type present in the image formed on the print medium P corresponds. That is, the information processing device 20 also functions as a defect discrimination device. "Class of defect type" means the defect type present in a printed image. The information processing device 20 controls the printer 10 so as to execute printing under appropriate printing conditions corresponding to the type of the print medium P. Note that the defect discrimination system for inspection image according to the present disclosure may have a system configuration that does not include the printer 10. It is also possible to use a camera or the like instead of the scanner 30.

Figure 2:
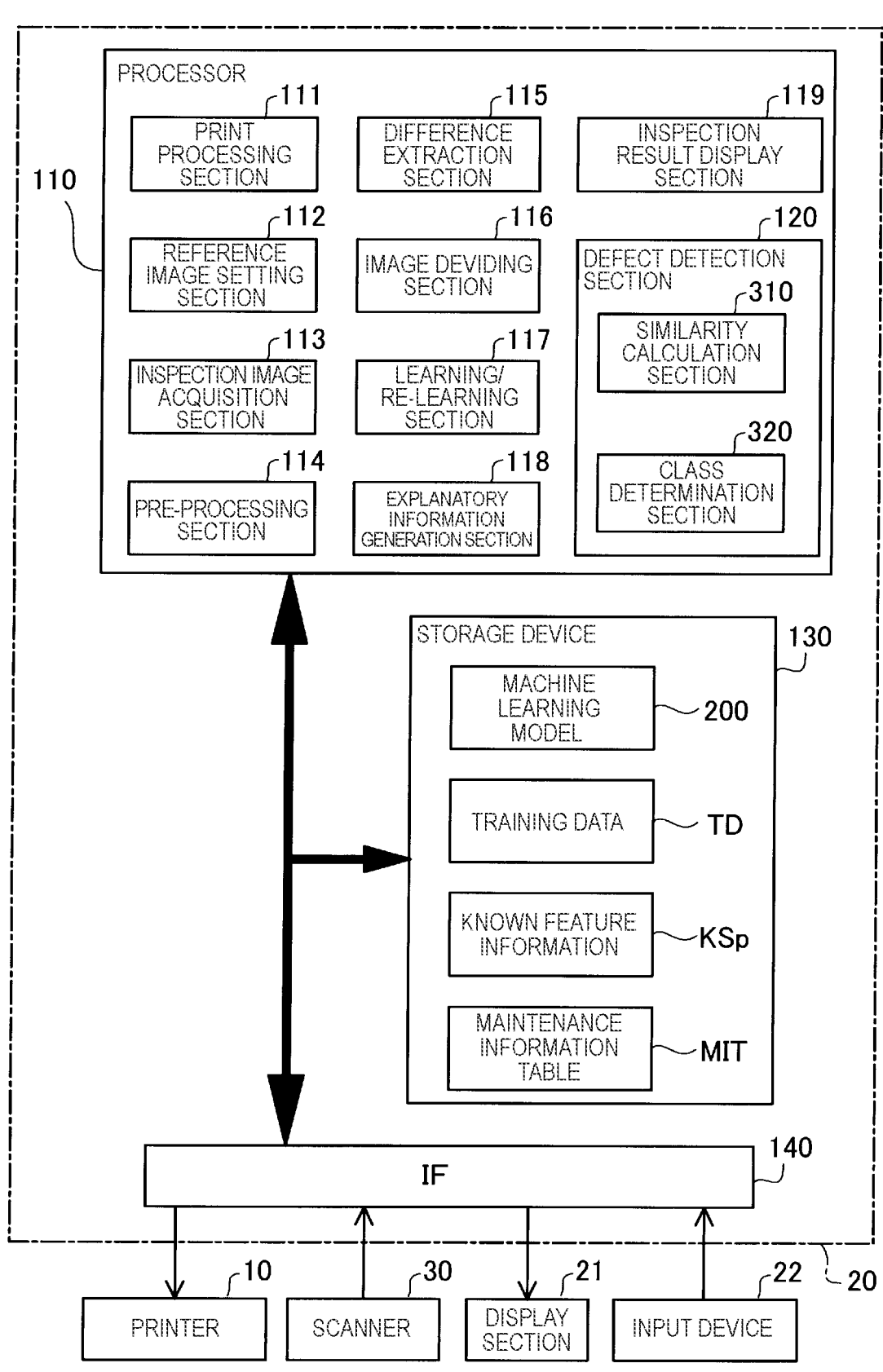
FIG. 2 is a block diagram of an information processing device.

FIG. 2 is a block diagram showing the functions of the information processing device 20. The information processing device 20 includes a processor 110, a storage device 130, and an interface circuit 140. In addition to the printer 10 and the scanner 30, an input device 22 and a display section 21 are connected to the interface circuit 140. Although not a limitation, for example the processor 110 not only has a function of executing processing (to be described in detail below), but also has a function of displaying data on the display section 21, data obtained by the processing, data generated in the course of the processing, maintenance information of the printer 10 as a result of the processing, and the like.

The processor 110 functions as a print processing section 111, a reference image setting section 112, an inspection image acquisition section 113, a pre-processing section 114, a difference extraction section 115, an image dividing section 116, a learning/re-learning section 117, an explanatory information generation section 118, an inspection result display section 119, a defect detection section 120, and the like. The print processing section 111 realizes a function of executing a process of printing the original image input from the input device 22 by using the printer 10. The reference image setting section 112 prepares the reference image as a reference of an image in which a defect is to be detected, and acquires image data of the reference image. The image data of this reference image does not contain defects. The reference image setting section 112 may prepare the reference image by reading, with the scanner 30, the image printed by the printer 10 in a state in which it is confirmed that no defect has occurred. The inspection image acquisition section 113 acquires image data of the inspection image, which is the image that was printed on the print medium P by the printer 10 and then read by the scanner 30. As described above, a format of the image data of the reference image and a format of the image data of the inspection image are the same format, for example, the RGB format. Further, the resolution of the image data of the inspection image is converted so as to be equal to the resolutions r1 of the reference image.

Figure 3:
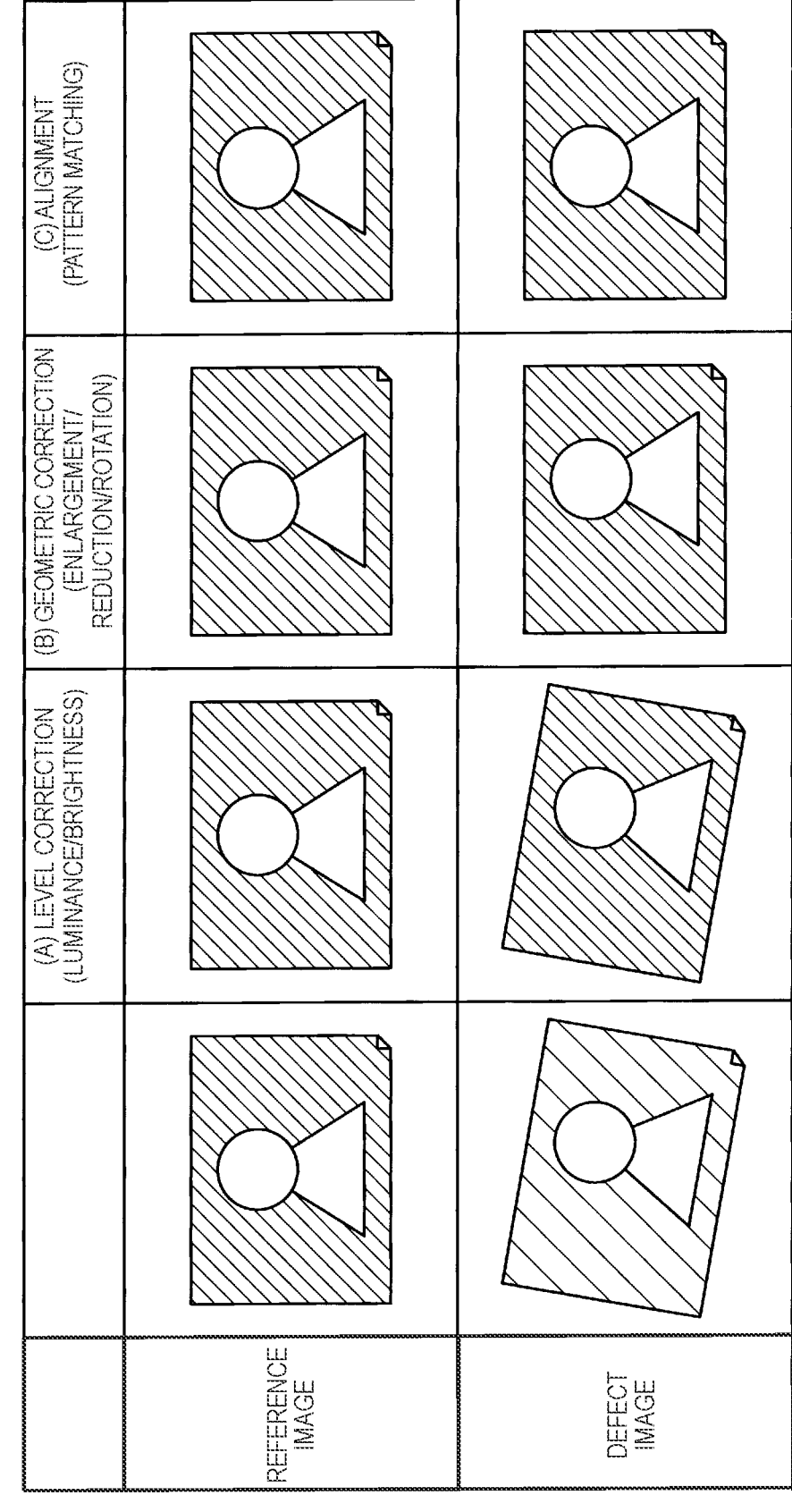
FIG. 3 is an explanatory diagram showing an example of a pre-process.

The pre-processing section 114 executes at least one of the following processes. FIG. 3 is an explanatory diagram showing an example of the pre-process.

(A) Level correction: This is correction for matching the levels of brightness, color phase, saturation, and the like between the reference image and a defect image. Originally, both images are the same image as a whole, but since the image is read by using the scanner 30 after printing, it may be necessary to adjust the level.

(B) Geometric correction: This is correction for making the reference image and the defect image geometrically the same shape. Correction such as adjustment of magnification of both images by enlargement and reduction, correction of distortion, and correction of a curve in a rotation direction are performed.

(C) Alignment correction: The misalignment between reference image and the defect image in the translational direction is corrected by pattern matching so that the positions of both images coincide with each other.

In the present embodiment, the correction of the curve in the rotation direction is included in the geometric correction, but may be included in the alignment correction.

The difference extraction section 115 of FIG. 2 generates a difference image of differences between the reference image and the defect image or the inspection image. Here, as described above, the "reference image" refers to an image to be printed and does not contain any defect type. As will be described in detail later, the "defect type" refers to a partial event that is caused by printing with the printer 10 and is different from the reference image, and that impairs the quality of the printed image. The defect type includes, in addition to known defect types learned by the machine learning model 200, unknown defect types that, although they have not been the subject of training, are recognized as defects by a person who performs image inspection. "Defect image" refers to an image that contains such known or unknown defect types. A defect image is used to learn a defect type. "Inspection image" refers to an image to be inspected, regardless of presence or absence of a defect type, in this case, an image obtained by using the scanner 30 to an image printed according to an original image. Therefore, a difference image obtained by calculating the difference between a reference image and a defect image for learning always includes a defect, but the difference image of differences between a reference image and an inspection image does not always include a defect and may not include a defect. The inspection image may be a target of re-learning of a defect type. The "reference image" is not limited to an image in a visible state, and includes data in a state that can be processed by the information processing device 20 or the like when the difference from the inspection image is obtained.

Figure 4:
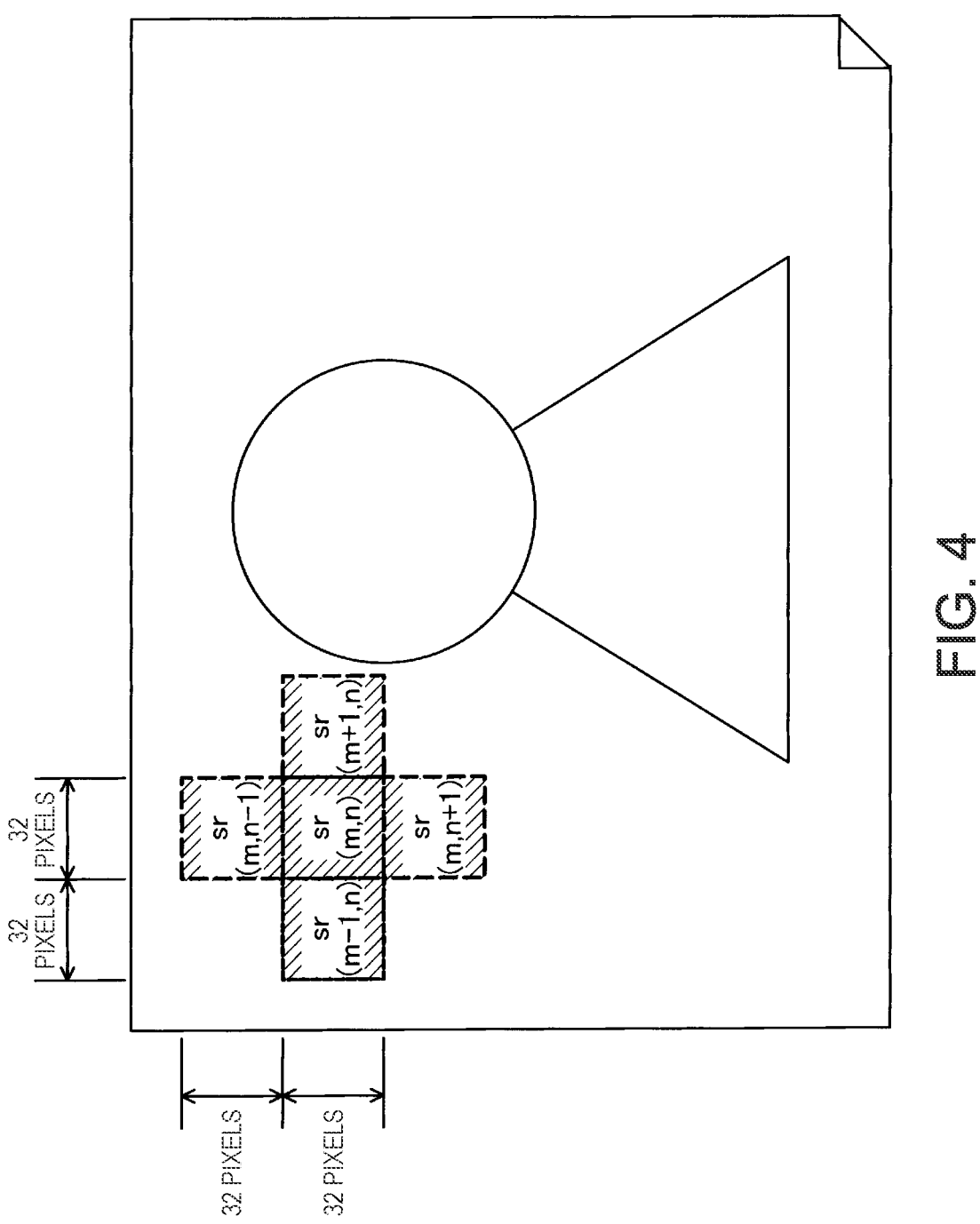
FIG. 4 is an explanatory diagram showing how an image is divided.

The image dividing section 116 divides the image into a plurality of small regions in which mutually adjacent regions partially overlap. Here, the image includes the reference image, the defect image, the inspection image, and the difference image. When the image to be divided is the difference image, the difference image that was divided is referred to as a "divided difference image". FIG. 4 is an explanatory diagram showing how an image is divided. In the example shown in FIG. 4, the image dividing section 116 divides the image into a plurality of small regions sr (m, n) that are divided difference images. The size of each small region is 32 pixels in the vertical direction and 32 pixels in the horizontal direction. In the present embodiment, the small region sr (m, n) contact the adjacent small regions sr (m−1, n), sr (m+1, n), sr (m, n−1), and sr (m, n+1), but does not overlap with them. However, the small region sr (m, n) may partially overlap with the adjacent small regions sr (m−1, n), sr (m+1, n), sr (m, n−1), and sr (m, n+1). In the case where the small region does not overlap with the adjacent small region, if there is a small defect at the boundary between two small regions, the similarity of the defect type may be small in both small regions, but in the case where the small region overlaps with the adjacent small region, the similarity of the defect type can be increased in at least one of the small regions.

The learning/re-learning section 117 causes the machine learning model 200 stored in the storage device 130 to perform re-learning. The re-learning includes at least one of various kinds of learning for correcting a machine learning model on which learning has been performed, such as reinforcement learning, additional learning, and transition learning.

The explanatory information generation section 118 generates explanatory information. The explanatory information is information that indicates, from a feature spectrum output by each vector neuron layer of the machine learning model 200 (to be described later), what kind of determination has been performed on which portion of the image with respect to difference information of differences between the given inspection image and the reference image.

Figure 5:
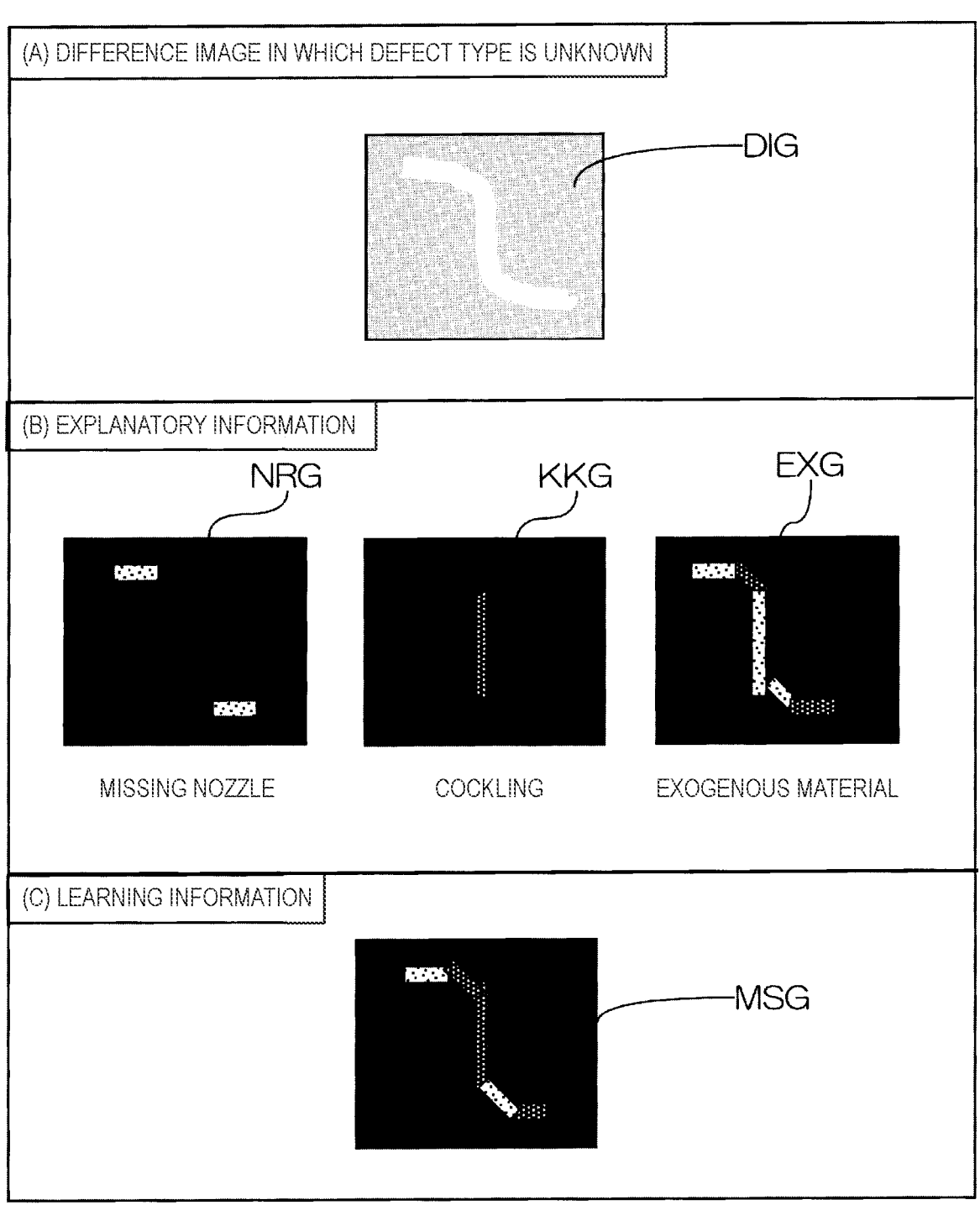
FIG. 5 is an explanatory diagram showing an example of processing for acquiring learning information used when generating a difference image by using explanatory information.

FIG. 5 is an explanatory diagram showing an example of processing for acquiring learning information used when generating a difference image by using explanatory information. The similarity between the difference image DIG, which is the difference between the reference image and the inspection image, and various defect types can be known from the feature spectrum of each of the vector neuron layers 230 to 250 of the machine learning model 200 (to be described later). In section (B) of same drawing, with respect to the defect types of "missing nozzle", "cockling", and "exogenous material", what degree of similarity is present in which region of the difference image is exemplified in the NRG, KKG, and EXG of each image. In each figure, a region where the inspection image and the reference image do not coincide with each other is shown as a highlight region. In the image NRG corresponding to the missing nozzle defect, a portion that indicates a feature spectrum that has a high similarity to the missing nozzle defect type is indicated by a high highlight, and the similarity is low. On the other hand, in the image KKG corresponding to the cockling defect, a portion that indicates a feature spectrum with a high similarity to the cockling defect type is indicated by a low highlight, and the similarity is high. In the image EXG corresponding to the exogenous material defect, a portion that indicates a feature spectrum that has a high similarity to the defect type of the exogenous material has unevenness, a part of which is indicated by a low highlight, and the similarity of the portion is high.

Therefore, as shown as an image MSG in section (C) of same drawing, a combination of these images is generated as the explanatory information for learning. Since the explanatory information is not an image itself, the image MSG schematically shows that the explanatory information is generated as having a predetermined value (density) for each region of the difference image.

The inspection result display section 119 of FIG. 2 displays the difference image and the discrimination result of the defect type on the display section 21. With respect to the image for each defect type of each divided difference image and the similarity information for each divided difference image, the inspection result display section 119 performs connection processing for connecting the divided difference image in which the defect type exists, and the divided difference images located around the divided difference image in which the defect type exists, thereby displaying the defect type that exists in the image and the defect occurrence position on the display section 21. The connection process will be described later.

The defect detection section 120 executes a process of discriminating the defect type which may exist in the image printed on the print medium P. The defect detection section 120 includes a similarity calculation section 310 and a class deciding section 320.

These sections 111 to 120 are realized by the processor 110 that executes a computer program stored in the storage device 130. However, these sections 111 to 120 may be realized by hardware circuits. The processor in the present specification is a term that also includes such a hardware circuit. The processor that executes the class discrimination process may be a processor included in a remote computer connected to the information processing device 20 via a network.

A machine learning model 200, training data TD, known feature information Ksp, and a maintenance information table MIT are stored in the storage device 130. The machine learning model 200 is used for processing by the defect detection section 120. A configuration example and an operation of the machine learning model 200 will be described later. The training data TD is a set of labeled data used for the learning of the machine learning model 200. In the present embodiment, the training data TD is a set of difference images corresponding to the defect types. The known feature information KSp is a set of feature spectrum obtained when the training data TD is input to the machine learning model 200, which has undergone learning. The feature spectrum will be described later. The maintenance information table MIT is a table in which information that indicates the content of maintenance to be performed on the printer 10 when the defect is detected in the printed image is registered. Information that indicates the contents of the maintenance is displayed on the display section 21 and presented to the user. Such information may include not only text but also images, moving images, sounds, and the like.

(2) Machine Learning Model Configuration

Figure 6:
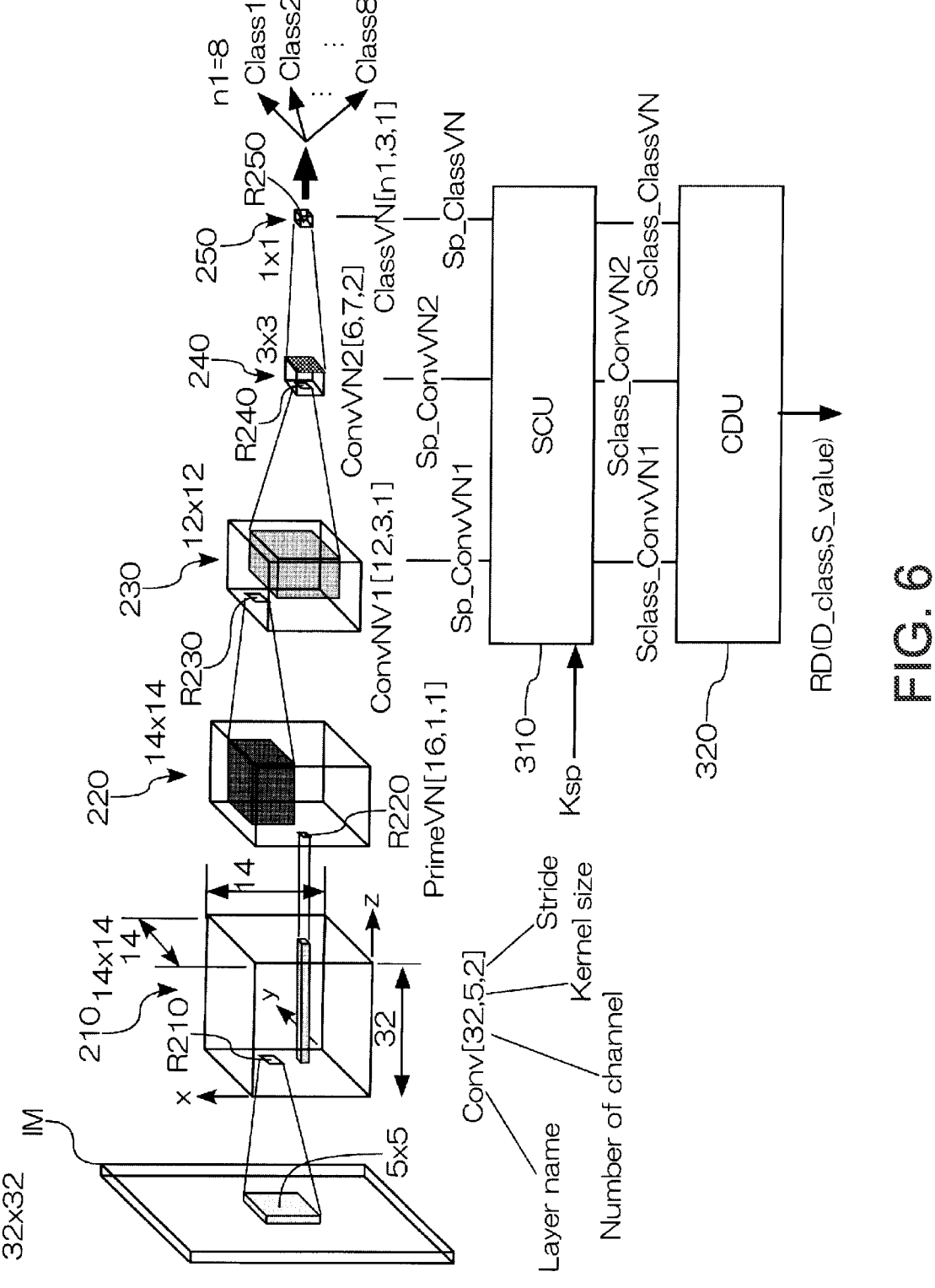
FIG. 6 is an explanatory diagram showing the configuration of a machine learning model.

FIG. 6 is an explanatory diagram showing the configuration of the machine learning model 200. In the machine learning model 200, input data IM is data of a two dimensional array. The machine learning model 200 includes, in order from the input data IM side, a convolutional layer 210, a primary vector neuron layer 220, a first convolutional vector neuron layer 230, a second convolutional vector neuron layer 240, and a classification vector neuron layer 250. Of these five layers 210-250, the convolutional layer 210 is the lowest layer and the classification vector neuron layer 250 is the highest layer. In the following description, the layers 210 to 250 are also referred to as "Cony-layer 210", "PrimeVN-layer 220", "ConvVN1-layer 230", "ConvVN2-layer 240", and "ClassVN-layer 250", respectively.

The Conv-layer 210 is a layer composed of scalar neurons. The other four layers 220 to 250 are layers composed of vector neurons. A vector neuron is a neuron whose input and output are vectors. Hereinafter, the term "node" is used as a superordinate concept of the scalar neuron and the vector neuron.

In the present embodiment, since the input data IM is image data, it is data of a two dimensional array. For example, the input data IM is image data of 32 pixels×32 pixels. Each pixel may have only a luminance value or may have data in the RGB format.

Although two convolutional vector neuron layers 230 and 240 are used in the example of FIG. 6, the number of convolutional vector neuron layers is arbitrary, and the convolutional vector neuron layer may be omitted. However, it is desirable to use more than one convolutional vector neuron layer. The configuration of layers 210 to 250 in FIG. 6 can be described as follows.

Description of Configuration of Each Layer
  Conv-layer 210: Conv[32, 5, 2]
  PrimeVN-layer 220: PrimeVN[16, 1, 1]
  ConvVN1-layer 230: ConvVN1 [12, 3, 1]
  ConvVN2-layer 240: ConvVN2 [6, 7, 2]
  ClassVN-layer 250: ClassVN[n1, 3, 1]
  Vector dimension VD: VD=16

In the description of these layers 210 to 250, a character string before parentheses is a layer name, and numbers in parentheses are the number of channels, a kernel surface size, and a stride in this order. For example, the layer name of the Conv-layer 210 is "Cony", the number of channels is 32, the kernel surface size is 5×5, and the stride is 2. In FIG. 6, these descriptions are shown below each layer. The number of channels is the number of neuron layers in each layer, since the Cony-layer 210 is composed of scalar neurons, it is denoted as Kernel in FIG. 6, since the other layers 220 to 250 are composed of vector neurons, the number of channels is denoted as VN. A hatched rectangle drawn in each layer represents the kernel surface size used when an output vector of an adjacent upper layer is calculated. In this embodiment, since the input data IM is image data of a two dimensional array, the kernel surface size is also two dimensional. In the above description, the dimension of the output vector of an individual vector neuron is constant at 16. Note that the values of the parameters used in the description of the respective layers 210 to 250 are examples and can be arbitrarily changed.

In FIG. 6, for the Conv-layer 210, a first axis x and a second axis y that defines plane coordinates of a node array, and a third axis z that represents a depth are shown. It is also shown that the size of the Conv-layer 210 in the x, y, and z directions are 14, 14, and 32. The size in the x direction and the size in the y direction are referred to as "resolution". In the present embodiment, the resolution in the x-direction and the resolution in the y-direction are the same in each layer. In FIG. 6, the resolution is shown above each layer. Specifically, the Conv-layer 210 is 14×14, the PrimeVN-layer 220 is 14×14, the ConvNV1-layer 230 is 12×12, the ConvNV2-layer 240 is 3×3, and the ClassVN-layer 250 is 1×1. The size in the z direction is the number of channels. These three axes x, y, and z are also used as coordinate axes that indicates the position of each node in other layers. However, in FIG. 6, these axes x, y, and z are not shown in layers other than the Conv-layer 210.

As is well known, a resolution W1 in the x and y direction after convolution are given by following equation.

$$W1 = \text{Ceil}\{(W0 - Wk + 1)/S\} \tag{1}$$

Here, W0 is a resolution of the convolution process target, Wk is the kernel surface size, S is the stride, and Ceil {X} is a function for performing an operation of rounding up X. Taking the Conv-layer 210 as an example, since W0=32, Wk=5, and S=2, $$W1 = \text{Ceil}\{(32 - 5 + 1)/2\} = 14.$$

The resolution of each layer shown in FIG. 6 is an example when the resolution of the input data IM in the y direction is 32, and the actual resolution of each layer is appropriately changed according to the size of the input data IM.

The ClassVN-layer 250 has n1 channels. In the example of FIG. 6, n1=3. In general, n1 is an integer greater than or equal to 2 and is the number of known classes that can be discriminated by using the machine learning model 200. Determination values Class1 to Class8 for eight known classes (defect type in the present embodiment) are output from three channels of the ClassVN-layer 250. Usually, a class that has the largest value among the determination values Class1 to Class8 is used as a class discrimination result of the input data IM. If the largest value among the determination values Class1 to Class8 is less than a predetermined threshold value, it may be determined that the class of the input data IM is unknown.

In the present disclosure, as will be described later, instead of using the determination values Class1 to Class8 of the ClassVN-layer 250, which is an output layer, a class-based similarity calculated from the output of a specific vector neuron layer is used to decide a discrimination class, in this embodiment, the type of the defect (defect type).

FIG. 6 also shows a partial region Rn in the layers 210, 220, 230, 240, and 250. The subscript "n" of the partial region Rn is the reference symbol of each layer. For example, the partial region R210 indicates a partial region in the Conv-layer 210. The "partial region Rn" is a region that is specified by a plane position (x, y) defined by the position of the first axis x and the position of the second axis y in each layer and includes a plurality of channels along the third axis z. The partial region Rn has dimensions of "Width"× "Height"×"Depth" corresponding to the first axis x, the second axis y, and the third axis z. In the present embodiment, the number of nodes included in one "partial region Rn" is the "1×1×depth number", that is, the "1×1×channel number".

As shown in FIG. 6, a feature spectrum Sp_ConvVN1 (to be described later) is calculated from the output of the ConvVN1-layer 230 and is input to the similarity calculation section 310. Similarly, a feature spectrum Sp_ConvVN2 and Sp_ClassVN are calculated from the outputs of the ConvVN2-layer 240 and the ClassVN-layer 250, respectively, and are input to the similarity calculation section 310. The similarity calculation section 310 calculates the class-based similarity Sclass_ConvVN1, Sclass_ConvVN2, and Sclass_ClassVN, which will be described later, by using these feature spectrum Sp_ConvVN1, Sp_ConvVN, and Sp_ClassVN and known feature information KSp created in advance. The class deciding section 320 generates the discrimination result RD by using at least a part of the class-based similarities Sclass_ConvVN1, Sclass_ConvVN2, and Sclass_ClassVN. The discrimination result RD includes a discrimination class D class and a similarity value S value corresponding to the discrimination class D class.

In the present disclosure, the vector neuron layer used for calculating the similarity is also referred to as a "specific layer". As the specific layer, an arbitrary number of one or more vector neuron layers can be used. The configuration of the feature spectrum, a calculation method for the similarity by using the feature spectrum, and a method deciding a discrimination class will be described later.

Figure 7:
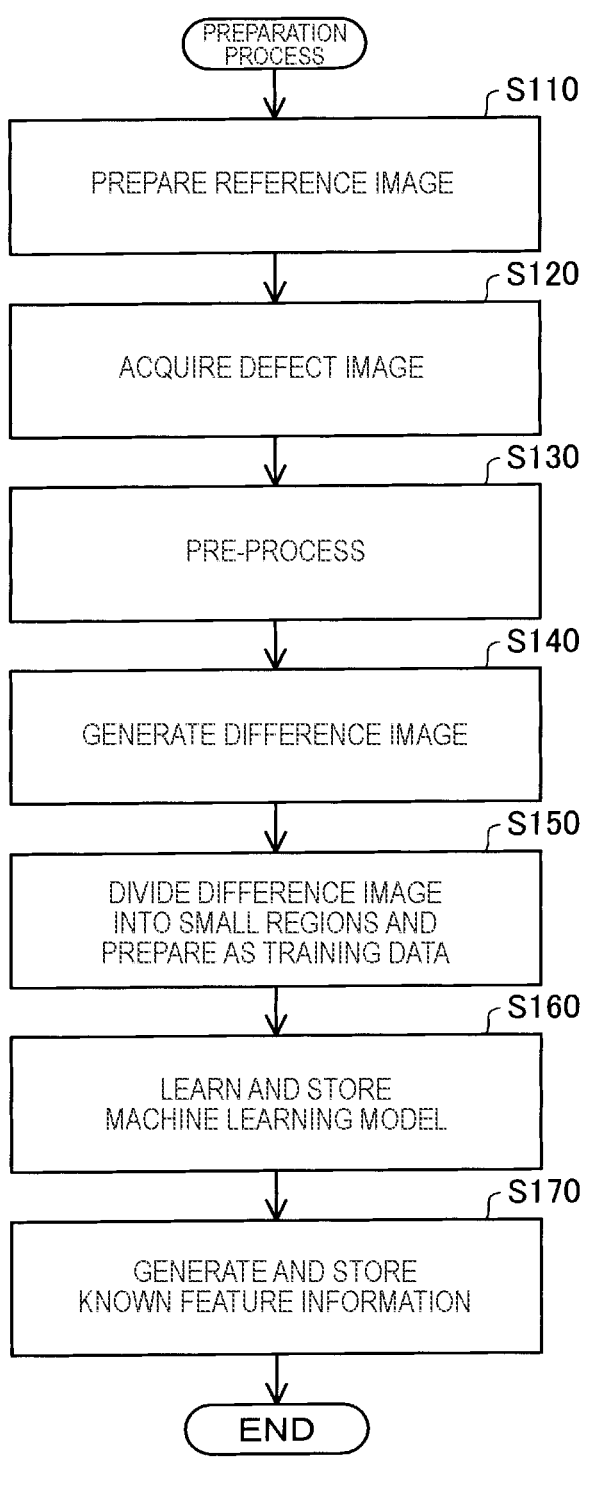
FIG. 7 is a flowchart showing a preparation process of the machine learning model.

FIG. 7 is a flowchart showing a processing procedure of a preparation process of the machine learning model. The preparation process is, for example, a process executed by a manufacturer of the printer 10. When this process is started, first, process for preparing the reference image is performed (step S110). This process is not process performed inside the information processing device 20, and the necessary reference image is selected for machine learning.

Next, the process of acquiring the defect image corresponding to the reference image is performed (step S120). The reference image is the original image to be printed by the printer 10, and the defect image is the image including the defect that may occur when the reference image is printed by the printer 10. In this embodiment, in order to learn various defects that may occur due to printing by the printer 10, when preparing the machine learning model, the reference image and the defect image corresponding to the reference image are necessary. In this embodiment, in step S120, the image in which the defect has occurred is read by the scanner 30 to acquire image data of the defect image.

As defects that can be generated by the printer 10, for example, the following are assumed.

(1) banding (2) dripping (3) missing nozzle (4) pinhole (5) exogenous material (6) distortion (7) cockling (8) color variation The defect image may be acquired by preparing the reference image and the defect image that corresponds to the reference image by using the same type of printer 10 and scanner 30 that produced respective defects. The reference image may be the image obtained by printing original image data in the RGB format by using the printer 10 and reading the data with the scanner 30, or an image equivalent to the printed image may be generated by simulation from the original image data in the RGB format and this is used.

After acquiring the reference image and the defect image, the pre-process is performed on the reference image acquired in step S110 and the defect image acquired in step S120 (step S130). Here, pre-process means at least one of the following processes, but in this embodiment, all of the processes are performed.

(A) Level correction: This is correction for matching the levels of brightness, color phase, saturation, and the like between the reference image and a defect image. Originally, both images are the same image as a whole, but since they are read by using the scanner 30, it may be necessary to match the levels.

(B) Geometric correction: This is correction for making the reference image and the defect image geometrically the same shape. Correction such as adjustment of magnification of both images by enlargement and reduction, correction of distortion, and correction of a curve in a rotation direction are performed.

(C) Alignment correction: The misalignment between the reference image and the defect image in the translational direction is corrected by pattern matching so that the positions of both images coincide with each other.

After performing the pre-process (step S130), the processor 110 generates the difference image of differences between the reference image and the defect image by using the difference extraction section 115 (step S140). The difference image may have only the luminance value or may have data in the RGB format. Next, the processor 110 divides the difference image into small regions and prepares them as training data (step S150). The processes of steps S110 to S150 may be performed separately, and the difference image corresponding to the defect type may be prepared in advance. This difference image is the training data TD used in the learning performed by the defect detection section 120.

The defect detection section 120 executes learning of the machine learning model 200 using the plurality of training data TD thus prepared (step S160). Each of the training data TD is given a label in advance. In the present embodiment, it is assumed that labels corresponding to the defects (3) to (8) described above are assigned to each of the training data TD. These labels correspond to the eight classes Class1-Class8 of machine learning model 200. In the present disclosure, "label" and "class" mean the same thing.

When the learning that uses the plurality of training data TD ends, the machine learning model 200, which has undergone learning, is stored in the storage device 130. When the learning of the machine learning model 200 is completed, next, in step S170 of FIG. 7, a process of generating the known feature information KSp by inputting a plurality of pieces of training data TD to the machine learning model 200 on which learning has been completed again is performed. The generated known feature information KSp is stored in the storage device 130. The known feature information KSp is a set of the feature spectrum described below.

(3) Generation of Known Feature Information

Figure 8:
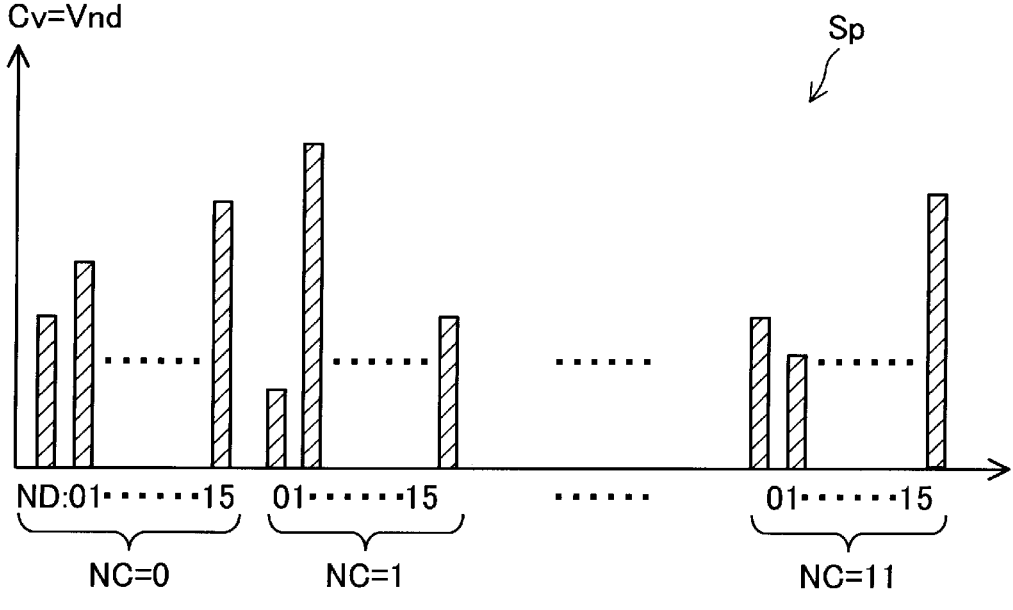
FIG. 8 is an explanatory diagram showing a feature spectrum.

FIG. 8 is an explanatory diagram showing a feature spectrum Sp obtained by inputting arbitrary input data to the machine learning model 200 on which learning was completed. Here, the feature spectrum Sp obtained from the output of the ConvVN1-layer 230 will be described. The horizontal axis in FIG. 8 represents positions of vector elements related to output vectors of a plurality of nodes included in one partial region R230 of the ConvVN1-layer 230. The position of this vector element is represented by a combination of the element number ND of the output vector at each node and the channel number NC. In the present embodiment, since the vector dimension is 16, the element number ND of the output vector is 16 from 0 to 15. Since the number of channels in the ConvVN1-layer 230 is 12, the channel number NC is 12 from 0 to 11. In other words, the feature spectrum Sp is obtained by arranging a plurality of element values of an output vector of each vector neuron included in one partial region R230 over a plurality of channels along the third axis z.

The vertical axis in FIG. 8 indicates the feature value $C_V$ at each spectral position. In this example, the feature value $C_V$ is a value VND of each element of the output vector. As the feature value $C_V$, a value obtained by multiplying the value VND of each element of the output vector by a normalization coefficient may be used, or the normalization coefficient may be used as it is. In the latter case, the number of feature values $C_V$ included in the feature spectrum Sp is equal to the number of channels and is 12. The normalization coefficient is a value corresponding to the vector length of the output vector of the node.

Since the number of the feature spectrum Sp obtained from the output of the ConvVN1-layer 230 for one input data is equal to the number of plane positions (x, y) of the ConvVN1 layer 230, that is, the number of partial regions R230, the number of the feature spectrum Sp is 12×12 (144). Similarly, 3×3 (9) feature spectra Sp are obtained from the output of the ConvVN2-layer 240, and one feature spectrum Sp is obtained from the output of the ClassVN-layer 250 for one input data.

When the training data TD is input again to the machine learning model 200 on which learning was completed, then the similarity calculation section 310 of FIG. 2 obtains the feature spectrum by the same method as that for calculating the feature spectrum Sp shown in FIG. 8. Since this feature spectrum is prepared in advance unlike the feature spectrum obtained when the defect type is actually detected and discriminated, it is hereinafter referred to as known feature information in order to distinguish each other.

Figure 9:
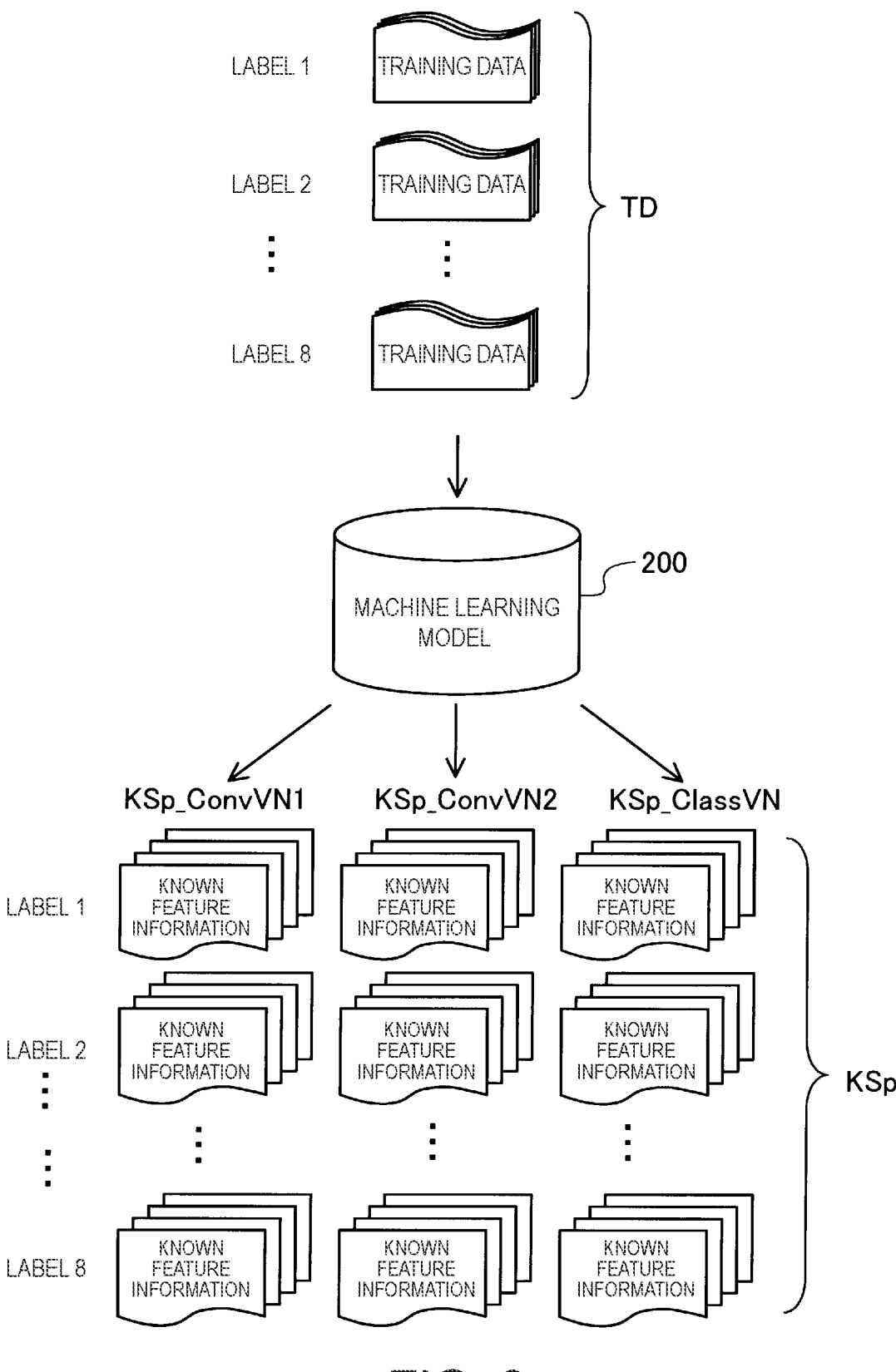
FIG. 9 is an explanatory diagram showing how known feature information is created by using training data.

FIG. 9 is an explanatory diagram showing how the known feature information KSp is created by using the training data TD. In this example, by inputting the training data TD that has labels of 1 to 8 to the machine learning model 200 that has undergone learning, known features information KSp_ConvVN1, KSp_ConvVN2, and KSp ClassVN associated with respective labels or classes are obtained from outputs of three vector neuron layers, that is, the ConvVN1-layer 230, the ConvVN2-layer 240, and the ClassVN-layer 250. The known feature information KSp_ConvVN1, KSp_ConvVN2, and KSp ClassVN are stored in the storage device 130 as known feature information KSp.

FIG. 10 is an explanatory diagram showing the configuration of the known feature information KSp. In this example, the known feature information KSp_ConvVN1 obtained from the output of the ConvVN1-layer 230 is shown. The known feature information KSp_ConvVN2 obtained from the output of the ConvVN2-layer 240 and the known feature information KSp ClassVN obtained from the output of the ClassVN-layer 250 have the same configuration, but are not shown in FIG. 10. As the known feature information KSp, it is sufficient that the information obtained from the output of at least one vector neuron layer is registered.

Each record of the known feature information KSp_ConvVN1 includes a parameter i that indicates an order of the label or the class, a parameter j indicating an order of the specific layer, a parameter k indicating an order of the partial region Rn, a parameter q indicating the date number, and known feature information components. The known feature information components are components corresponding to the data number q of each partial region k of the known feature information KSp_ConvVN1 corresponding to each label or class.

The parameter i of the class takes a value of 1 to 8, which is the same as the label. The parameter j of the specific layer takes a value of 1 to 3 that indicates which of the three specific layers 230, 240, and 250 it is. The parameter k of the partial region Rn takes a value the indicates which one of the plurality of partial regions Rn included in each specific layer it is, that is, which one of the plane positions (x, y) it is. Regarding the ConvVN1-layer 230, since the number of the partial regions R230 is 144, k=1 to 144. The parameter q of the data number indicates the number of the training data to which the same label is attached, and takes a value of 1 to max1 for the class 1, 1 to max2 for the class 2, . . . , and 1 to max8 for the class 8.

The plurality of pieces of training data TD used in step S120 need not be the same as the plurality of pieces of training data TD used in step S110. However, also in step S120, if some or all of the plurality of training data TD used in step S110 are used, there is an advantage that it is not necessary to prepare new training data.

(4) Defect Type Discrimination Process

After the preparation described above is performed, the process of discriminating a defect type that may occur in the image printed on the print medium P is performed. FIG. 11 is a flowchart showing the print image defect type discrimination process routine using the machine learning model on which learning was completed. Although this processing routine is indicated focusing on the processing of the processor 110 of the information processing device 20, a part of the processing can be performed as processing by the user who uses the printer 10. Explanation will be given each time the process may be performed by the user.

The process showing in FIG. 11 is started when a desired image is printed by the printer 10. When this process is started, first, the printed image is read as the inspection image by using the scanner 30 (step S400). This reading process may be performed each time the image is printed on the print medium P, or may be performed by the user at a specific timing.

Subsequently, the process of acquiring the reference image is performed (step S410). As described above, the reference image may be an image obtained by printing the data of the original image in the RGB format to be printed using a printer which has been properly maintained, that is, a printer which is compensated so as to not generate a defective image, and then reading the image using the scanner 30, or may be an image obtained by generating an image equivalent to the printed image by simulation from the data of the original image in the RGB format. This operation is performed in advance before printing, and is prepared as the reference image.

Next, the pre-process is performed on the inspection image and the reference image (step S420). This process is similar to the process of step S130 of the preparation process shown in FIG. 7. After the positions, sizes, rotation angles, and levels such as brightness of the images of the inspection image and the reference image are made to coincide with each other by the pre-process, a process for generating the difference image is performed (step S430). The difference image is divided into a plurality of small regions partially overlapping with adjacent small region to generate the divided difference image (step S435). The divided difference image thus obtained becomes data to be discriminated for discrimination of defect types described below. The pre-processing may be performed automatically or individually by the user.

Once the divided difference images, that is, the data to be discriminated, are generated, next, the defect detection section 120 inputs the data to be discriminated to the machine learning model 200, which has undergone learning, and performs the process of calculating the feature spectrum Sp (step S440). Using the obtained feature spectrum Sp and the known feature information KSp generated and stored in step S170 of FIG. 7 described above, the class-based similarity is calculated by the similarity calculation section 310 (step S450).

Figure 12:
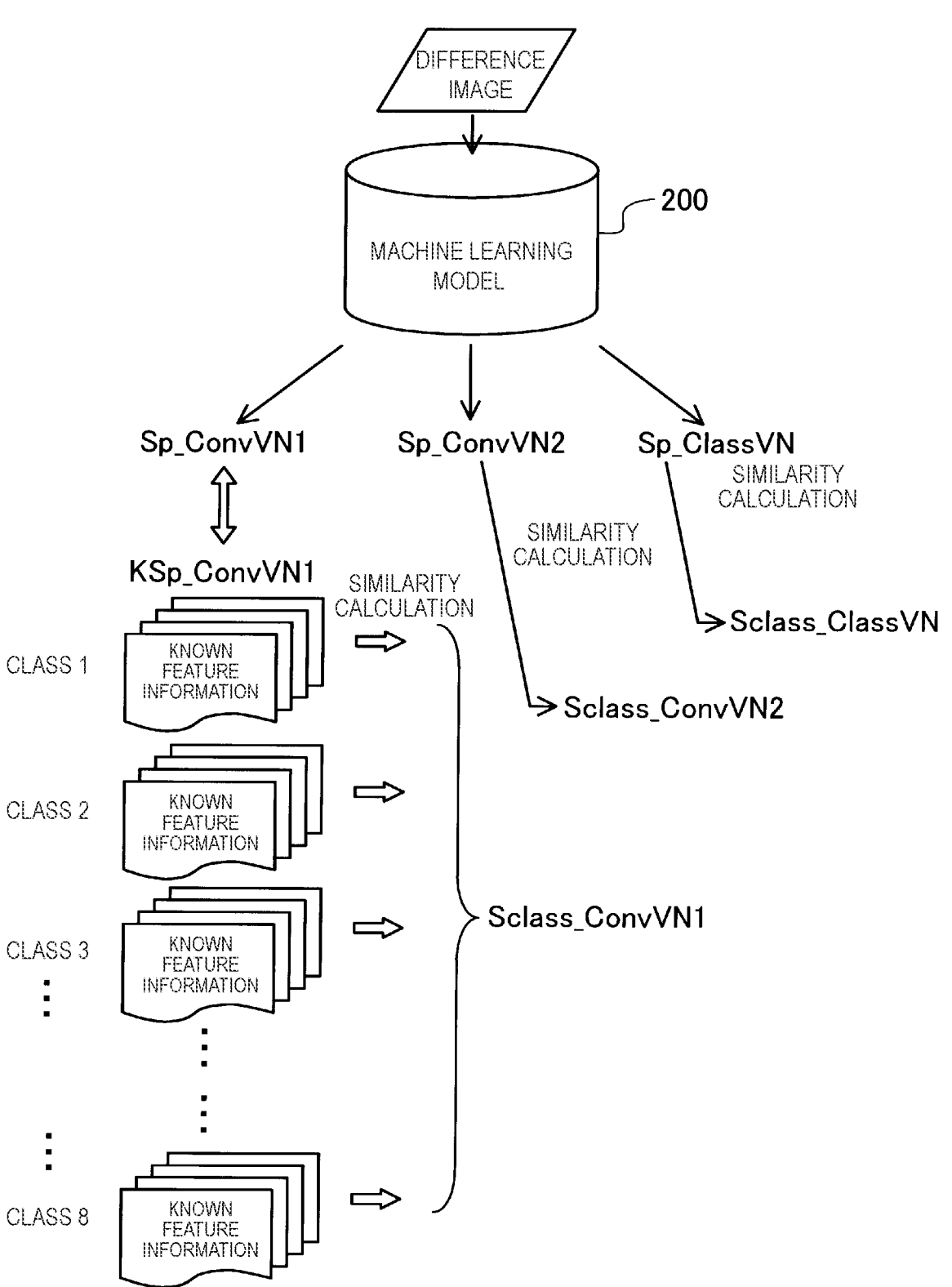
FIG. 12 is an explanatory diagram showing how the class-based similarity related to the data to be discriminated is obtained.

The method of calculating the class-based similarity will be described. FIG. 12 is an explanatory diagram showing how the class-based similarity related to the data to be discriminated is obtained. When the data to be discriminated is input to the machine learning model 200, the defect detection section 120 calculates feature spectrum Sp_ConvVN1, Sp_ConvVN2, and Sp_ClassVN from the outputs of the ConvVN1-layer 230, the ConvVN2-layer 240, and the ClassVN-layer 250. Upon receipt of the feature spectrum, the similarity calculation section 310 calculates the class-based similarity for each specific layer. To be more specific, the class-based similarity Sclass_ConvVN1 is calculated by using the feature spectrum Sp_ConvVN1 obtained from the output of the ConvVN1-layer 230 and the known feature information KSp_ConvVN1, the class-based similarity Sclass_ConvVN2 is calculated by using the feature spectrum Sp_ConvVN2 obtained from the output of the ConvVN2-layer 240 and the known feature information KSp_ConvVN2, and the class-based similarity Sclass_S-classVN is calculated by using the feature spectrum Sp_ClassVN obtained from the output of the ClassVN-layer 250 and the known feature information KSp ClassVN. In FIG. 12, the known feature information is shown only for the ConvVN1-layer 230, but the class-based similarity lso is calculated for the ConvVN2-layer 240 and the ClassVN-layer 250 by a similar method.

It is not necessary to generate all of the class-based similarities Sclass_ConvVN1, Sclass_ConvVN2, and Sclass_ClassVN by using each of the three vector neuron layers 230, 240, and 250, but it is desirable to calculate the class-based similarities by using one or more of these vector neuron layers. As described above, in the present disclosure, the vector neuron layer used for calculating the similarity is referred to as the "specific layer". As will be described below, in the present embodiment, outputs from three vector neuron layers 230, 240, and 250 are used to generate the class-based similarities Sclass_ConvVN1, Sclass_ConvVN2, and Sclass_ClassVN, and the class is discriminated by using the plurality of class-based similarities. Of course, any one or two of the class-based similarities Sclass_ConvVN1, Sclass_ConvVN2, and Sclass_ClassVN may be obtained using any one or two of the outputs from the three vector neuron layers 230, 240, and 250 to discriminate the defect type.

An example of a calculation method for such class-based similarity will be described below. In the present embodiment, as will be described below, the class-based similarity is obtained without considering the partial region Rn at all, but in addition to this method, there is also known a calculation method for calculating the class-based similarity without considering the correspondence between the feature spectrum Sp and the partial region Rn of the known feature information Ksp and a calculation method for calculating the class-based similarity between the feature spectrum Sp and the corresponding partial regions Rn of the known feature information KSp.

In the calculation method of class-based similarity (1) the class-based similarity Sclass (i, j), which are similarities between all feature spectrum Sp obtained from the output of the specific layer j in accordance with data to be discriminated and all known feature information KSp associated with the specific layer j and each class i, are obtained for each class, (2) for each class i, the maximum value of a plurality of the class-based similarity Sclass (i, j) is obtained as the similarity value S value between the feature spectrum Sp and the known feature information KSp, and (3) the class associated with the maximum similarity value S value over a plurality of classes i is decided as the discrimination class D class.

FIG. 13 is an explanatory diagram showing an example of the calculation method for the class-based similarity in the present embodiment. In this calculation method, the class-based similarity Sclass (i, j) is calculated from the outputs of the ConvVN1-layer 230, the ConvVN2-layer 240, and the ClassVN-layer 250, which are specific layers, without considering the local similarity.

The class-based similarity Sclass (i, j) obtained by this calculation method is calculated by using the following equation.

$$\text{Sclass}(i,j)=\max[G\{Sp(j,k\text{=all}),KSp(i,j,k\text{=all},q\text{=all})\}] \qquad (2)$$

Here, Sp(j, k=all) is a feature spectrum obtained from outputs of all partial regions k of the specific layer j in accordance with the data to be discriminated. A function max[ ] is a function for obtaining the maximum value of the elements in [ ].

In the example of FIG. 13, a final discrimination result RD_ConvVN1 is further decided from the class-based similarity Sclass (i, j). The discrimination result RD_ConvVN1 can be represented in a format that includes the discrimination class D class and the similarity value S value corresponding to the discrimination class D class. The similarity value S value is obtained by taking the maximum value among the similarity values for eight classes 1 to 8 in the class-based similarity Sclass (i, j). The discrimination class D class is a class having the maximum similarity value in the class-based similarity Sclass (i, j). As shown, j=1, that is, in the vector neuron layer 230, the class-based similarity Sclass (3, 1) of the class 3 is the value 0.95, which is the maximum value among all the classes, and thus the final discrimination result RD_ConvVN1 is $$RD\_\text{ConvVN1}(D\_\text{class},S \text{ value})=(3,0.95).$$

Similarly, for the ConvVN2-layer 240 and the ClassVN-layer 250, the class-based similarities Sclass_ConvVN2 and Sclass_ClassVN are calculated, and the final discrimination results RD_ConvVN2 and RD ClassVN are decided for each layer.

Figure 14:
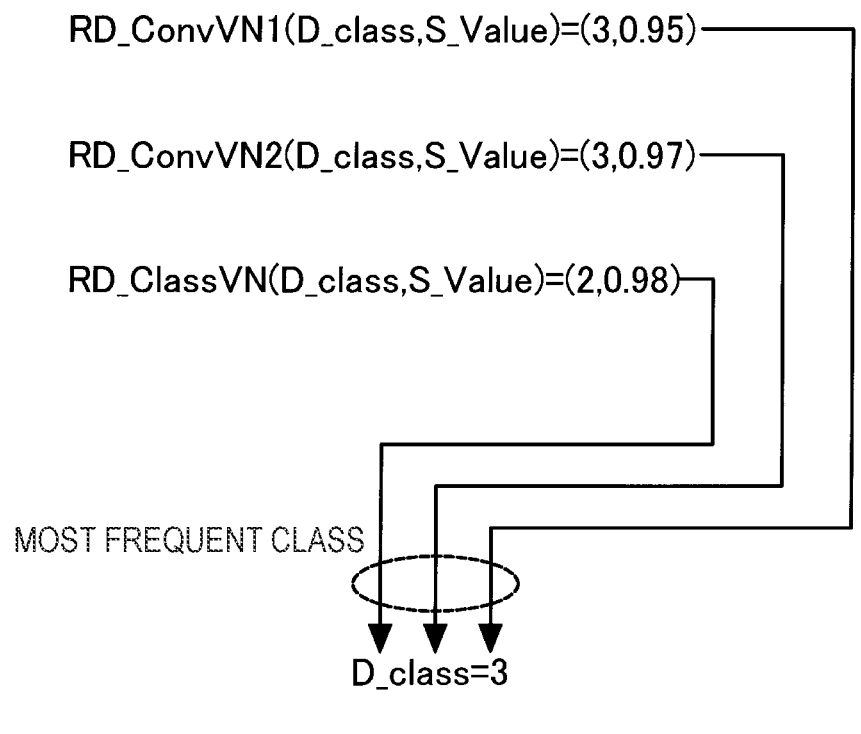
FIG. 14 is an explanatory view showing an example of the display of a discrimination result of a defect type.

After the class-based similarity Sclass_ConvVN1, Sclass_ ConvVN2, and Sclass_ClassVN and the final discrimination results RD_ConvVN1, RD_ConvVN2, and RD ClassVN are obtained by using the outputs from the three vector neuron layers 230, 240, and 250, the most frequent class D Class is obtained from the final discrimination results based on the outputs from the three vector neuron layers 230, 240, and 250 as shown in FIG. 14. In this example, since the outputs of the three vector neuron layers 230, 240, and 250 are class 3, the final discrimination result of the most frequent class D Class is class 3.

In step S460 in FIG. 11, the class deciding section 320 discriminates the class of the difference image obtained from the inspection image and the reference image, that is, the defect type the exists in the printed image, according to the class-based similarity obtained in step S450. As described above, the defect type discrimination result includes that the following eight defect types are being learned.

(1) banding
(2) dripping
(3) missing nozzle
(4) pinhole
(5) exogenous material
(6) distortion
(7) cockling
(8) color variation Here, each number corresponds to the class to be discriminated. In addition to specifying the defect types, an output indicating that none of the defect types has been specified may be provided. That is, when none of the defect types can be specified in the discrimination result of the defect type, this is classified as "no defect type specified". Therefore, the total number of classes for defect type discrimination is finally nine and the following class may be treated as existing.

(0) No Defect Type Specified

The class "no defect type specified" may be prepared as an output of the machine learning model 200, or may be prepared as a class to be output when none of the outputs (eight outputs in this example), which correspond to defect types, is equal to or more than a predetermined similarity.

After the defect types are discriminated, it is judged whether or not there is a defect in the printed image (step S470). When it is judged that there is no defect (step S470: "NO"), in the present embodiment the process exits to "END" as is and the present processing routine ends. However, the user' judgment may be accepted as to whether or not the judgment that there is no defect is correct, and when that judgment is incorrect, additional learning may be performed as will be described later.

When any defect type is found (step S470: "YES"), the processor 110 causes the defect detection section 120 to acquire a state of the defect (step S480). The state of the defect is any one of the defect type, the position of a defect, a size of the defect, the state of the defect obtained from explanatory information, and the similarity to the defect type. The defect detection section 120 arranges the similarity of the defect types in descending order, and determines the defect type that has the highest similarity as the defect type when the similarity of the defect type that has the highest similarity is equal to or greater than a first threshold value and a difference obtained by subtracting the similarity of the defect type that has the second highest similarity from the similarity of the defect type that has the highest similarity is equal to or greater than a second threshold value. The position of the defect is calculated from the coordinates of the small region. The size of the defect is calculated from how many small regions the defect spans across. Upon acquiring the state of the defect, the processor 110 causes the inspection result display section 119 to execute a process for displaying on the display section 21 the defect type found in the printed inspection image (step S490).

Figure 15:
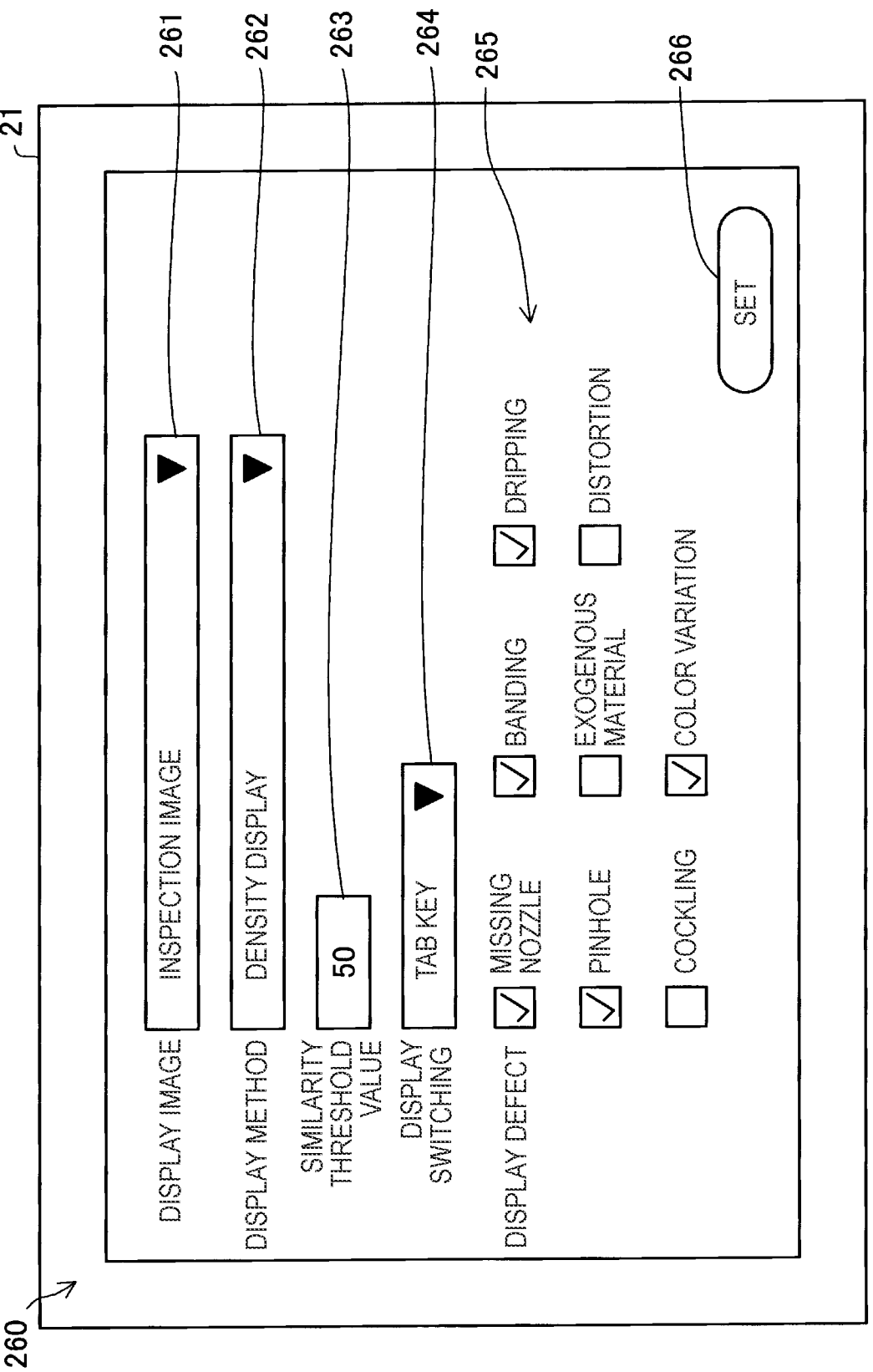
FIG. 15 is an explanatory diagram showing an inspection result display control screen displayed on a display section by an inspection result display section.

FIG. 15 is an explanatory diagram showing an inspection result display control screen 260 displayed on the display section 21 by the inspection result display section 119. The inspection result display section 119 displays a display screen selection section 261, a display method selection section 262, a similarity threshold value input section 263, a display switching key selection section 264, a display defect selection section 265, and a set button 266 on the inspection result display control screen 260.

The display screen selection section 261 is a section for selecting the image displayed on the display section 21, and can be selected from among the inspection image, the reference image, and the difference image. The display method selection section 262 is a selection section of the display method of the defect displayed on the display section 21, and can be selected from among composite display, density display, inverting display, blinking display, enclosing display, and focus display. The composite display, density display, inverting display, blinking display, enclosing display, and focus display will be described later. The similarity threshold value input section 263 is a section for inputting the threshold value of the defect type displayed on the display section 21. That is, a defect type whose defect type threshold value is equal to or greater than the threshold value input in the similarity threshold value input section 263 is displayed on the display section 21, and a defect type whose threshold value is less than the threshold value input in the similarity threshold value input section 263 is not displayed on the display section 21. The display switching key selection section 264 is a selection section for a key to be used to switch the defect of interest in the focus display. In the example of FIG. 15, "Tab key" is selected. In this case, when the "Tab key" is pressed, the defect of interest is sequentially switched. A "mouse" or other pointing device can also be selected in the display switching key selection section 264. When "mouse" is selected and a mouse pointer displayed on the display section 21 is moved onto the defect, the defect is selected as the defect of interest, and information on the defect is displayed.

The display defect selection section 265 is a section for selecting the defect type displayed on the display section 21. Although all the defect types are displayed in the example of FIG. 15, only the selection section of the defect type detected in the inspection image may be displayed. Alternatively, all the defect types may be displayed, but defect types not detected in the inspection image may not be selected. The set button 266 is a button for confirming selection and input in the display screen selection section 261, the display method selection section 262, the similarity threshold value input section 263, the display switching key selection section 264, and the display defect selection section 265, and displaying the screen selected in the display screen selection section 261 on the display section 21.

Figure 16:
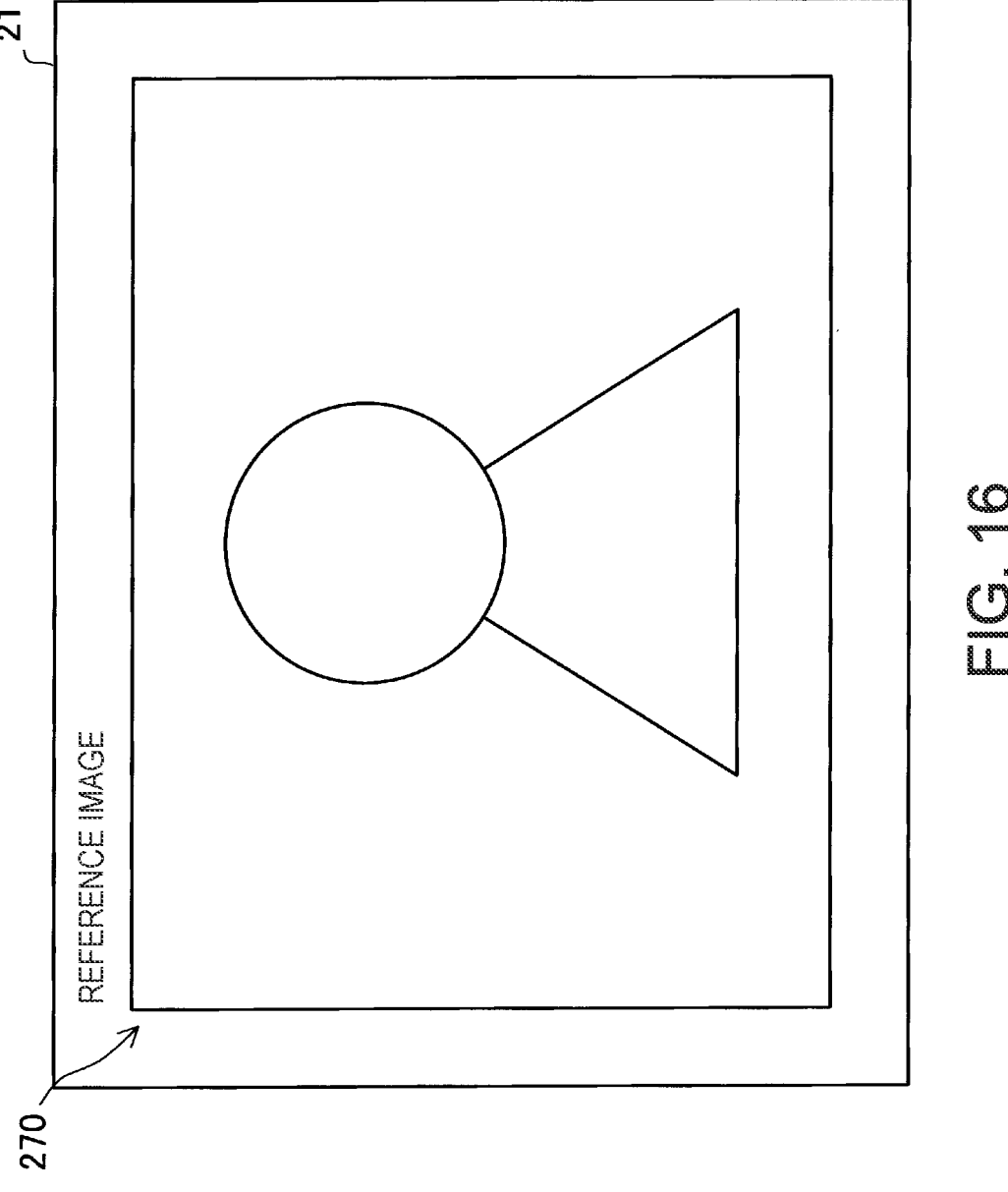
FIG. 16 is an explanatory diagram showing a reference image displayed on the display section by the inspection result display section.

FIG. 16 is an explanatory diagram showing a reference image 270 displayed on the display section 21 by the inspection result display section 119. Although no defect exists in the reference image 270, the defect may be displayed in an overlapping manner.

Figure 17:
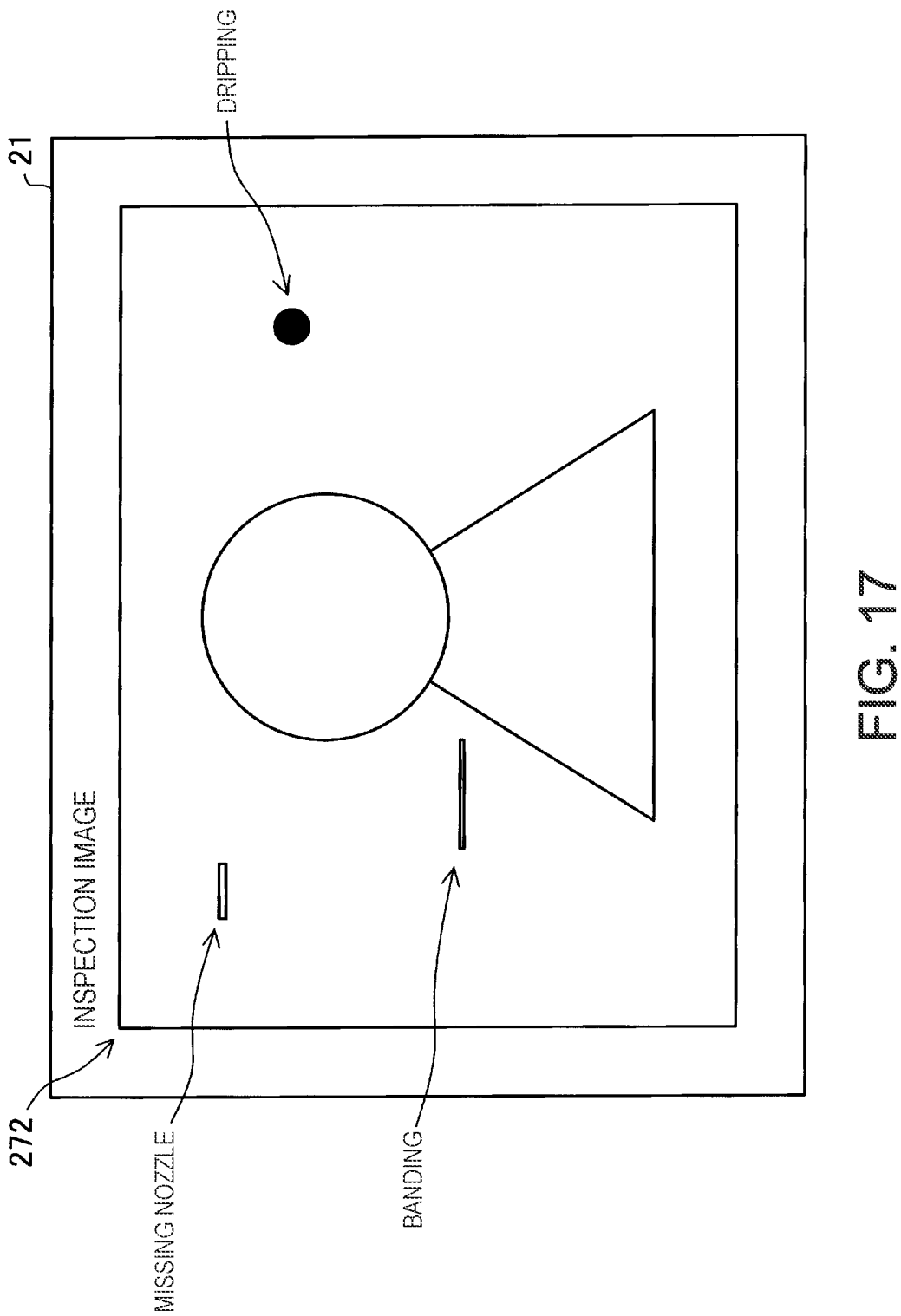
FIG. 17 is an explanatory diagram showing an inspection image displayed on the display section by the inspection result display section.

FIG. 17 is an explanatory diagram showing an inspection image 272 displayed on the display section 21 by the inspection result display section 119. When a defect that has a similarity equal to or higher than the threshold that was input in the similarity threshold value input section 263 is present in the inspection image 272, then the inspection result display section 119 adds the defect to the inspection image 272 and displays it on the display section 21. In the example shown in FIG. 17, the inspection result display section 119 displays in the inspection image 272 the three defect types of missing nozzle, dripping, and banding.

Figure 18:
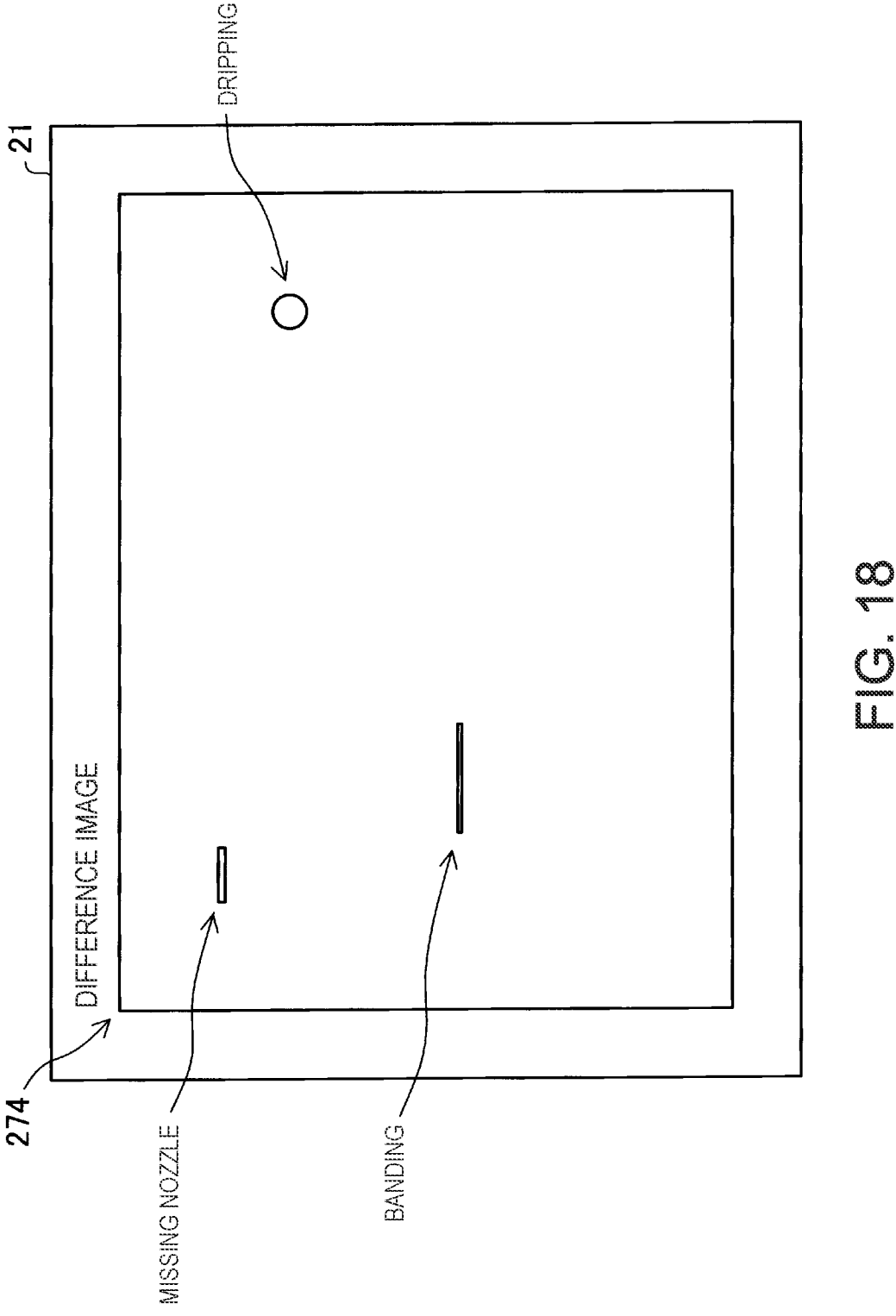
FIG. 18 is an explanatory diagram showing the difference image displayed on the display section by the inspection result display section.

FIG. 18 is an explanatory diagram showing the difference image 274 displayed on the display section 21 by the inspection result display section 119. In the difference image 274, since the images of the person displayed in the reference image 270 of FIG. 16 and the inspection image 272 of FIG. 17 are cancelled out by the difference extraction section 115, the inspection result display section 119 displays only the defective types.

Figure 19:
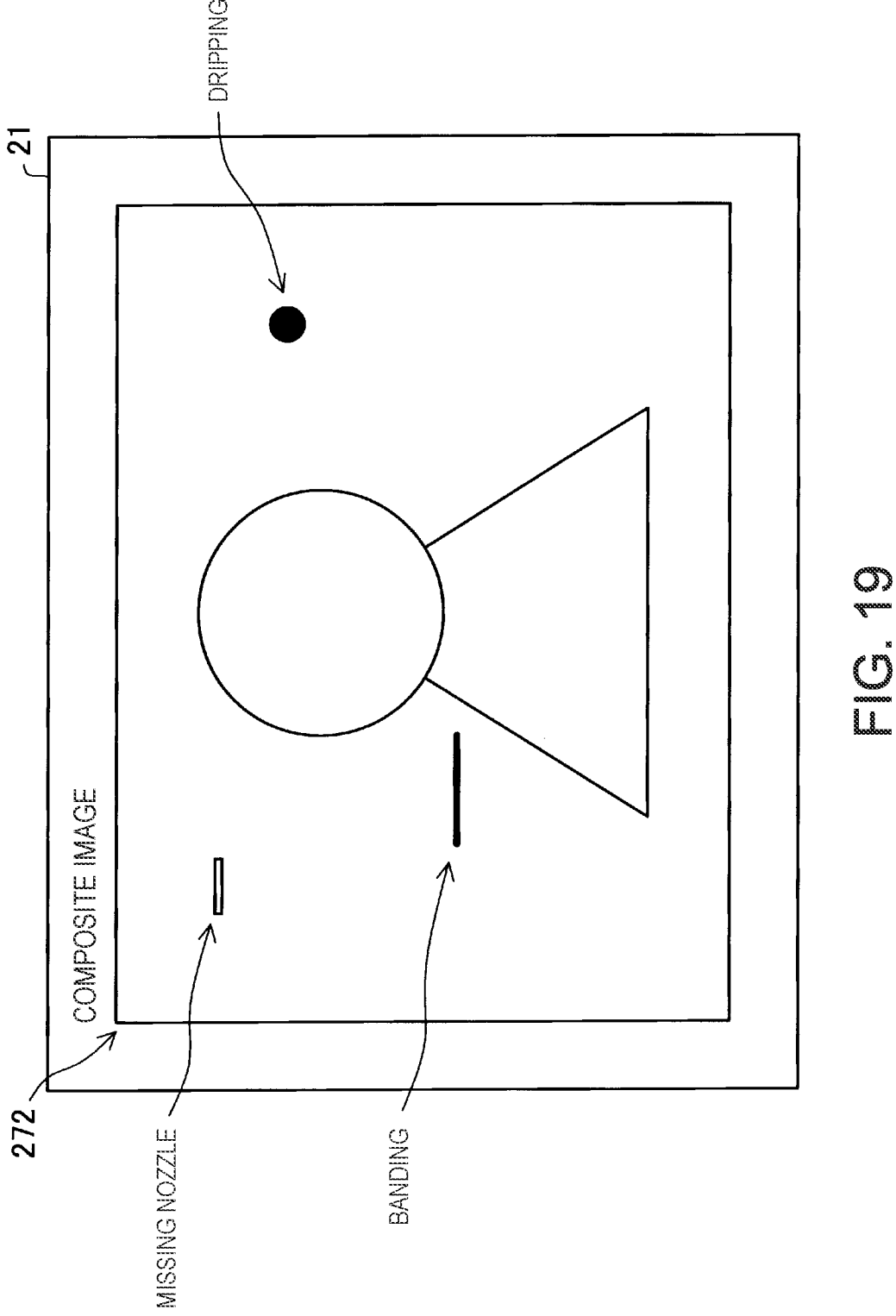
FIG. 19 is an explanatory diagram showing an example in which the inspection result display section compositely displays the inspection image displayed on the display section.

FIG. 19 is an explanatory diagram showing an example of the composite display of the inspection image 272 displayed on the display section 21 by the inspection result display section 119. In the composite display, for each defect type, the defect type is overlapped on the image in accordance with the defect shape based on the defect occurrence position and the explanatory information, and is displayed in color coding. In FIG. 19, the inspection result display section 119 displays the defect types in different colors on the inspection image 272, but may display the defect types in color coding on the difference image 274 or the reference image 270.

Figure 20:
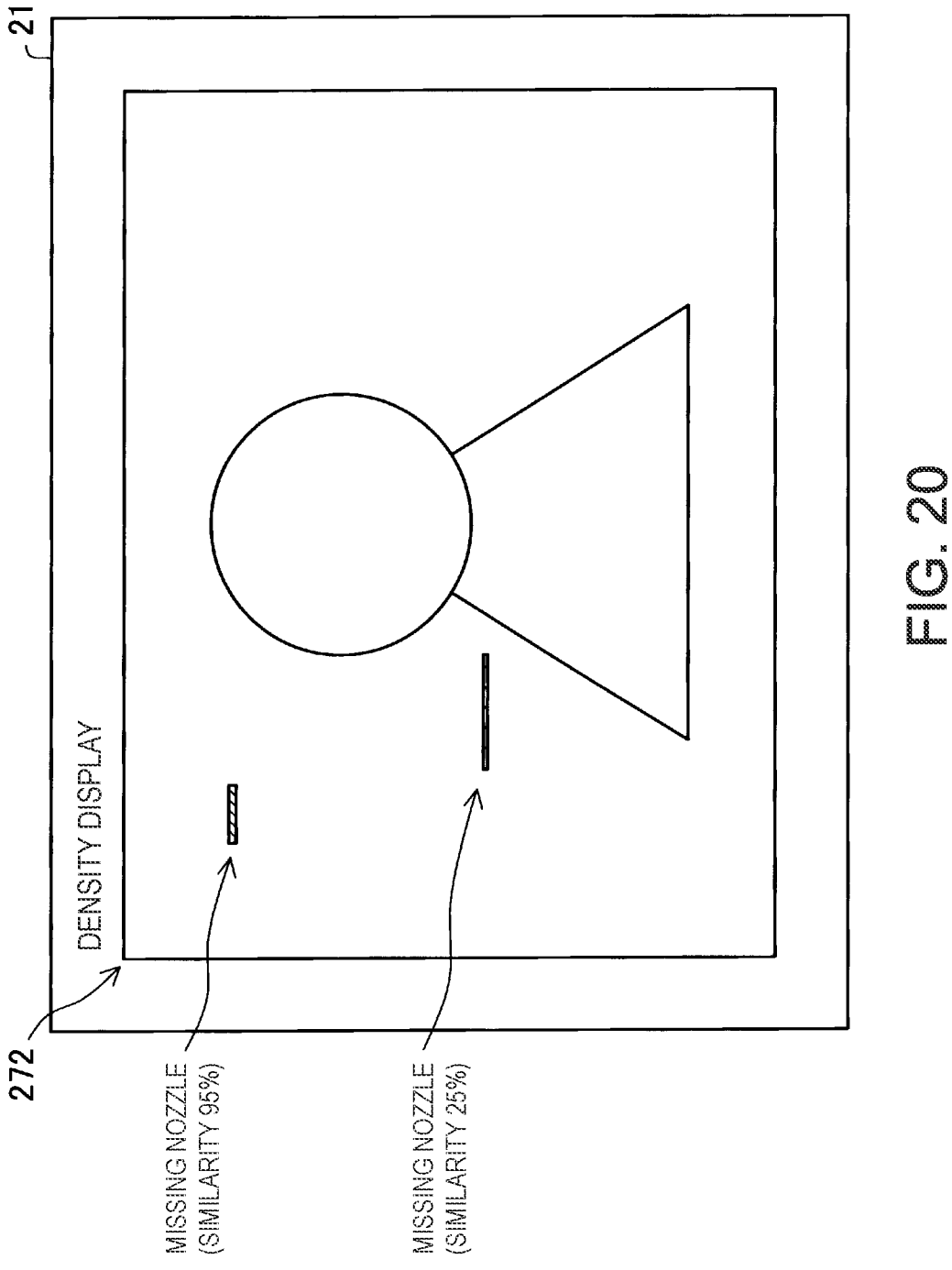
FIG. 20 is an explanatory diagram showing an example of density display of defect type with respect to the inspection image displayed on the display section by the inspection result display section.

FIG. 20 is an explanatory diagram showing an example of density display of defect type with respect to the inspection image 272 displayed on the display section 21 by the inspection result display section 119. The density display is the display in which the defect type is overlapped on the image according to the shape of the defect based on the defect occurrence position and explanatory information, and the density is changed according to the similarity. In the example showing in FIG. 20, the inspection result display section 119 displays the defect type of the missing nozzle darker when it has a similarity of 95% and the defect type of the missing nozzle lighter when it has the similarity of 25%. In the present embodiment, the inspection result display section 119 performs a different display for each defect type by color display for each defect type as shown in FIG. 19 and density display by shading as shown in FIG. 20, but the defect type may be displayed by another display. For example, the inspection result display section 119 may display the defect type in inverted display or may display the defect type by blinking display. Further, the inspection result display section 119 may display the defect type by enclosing the periphery of the display of the defect type.

Figure 21:
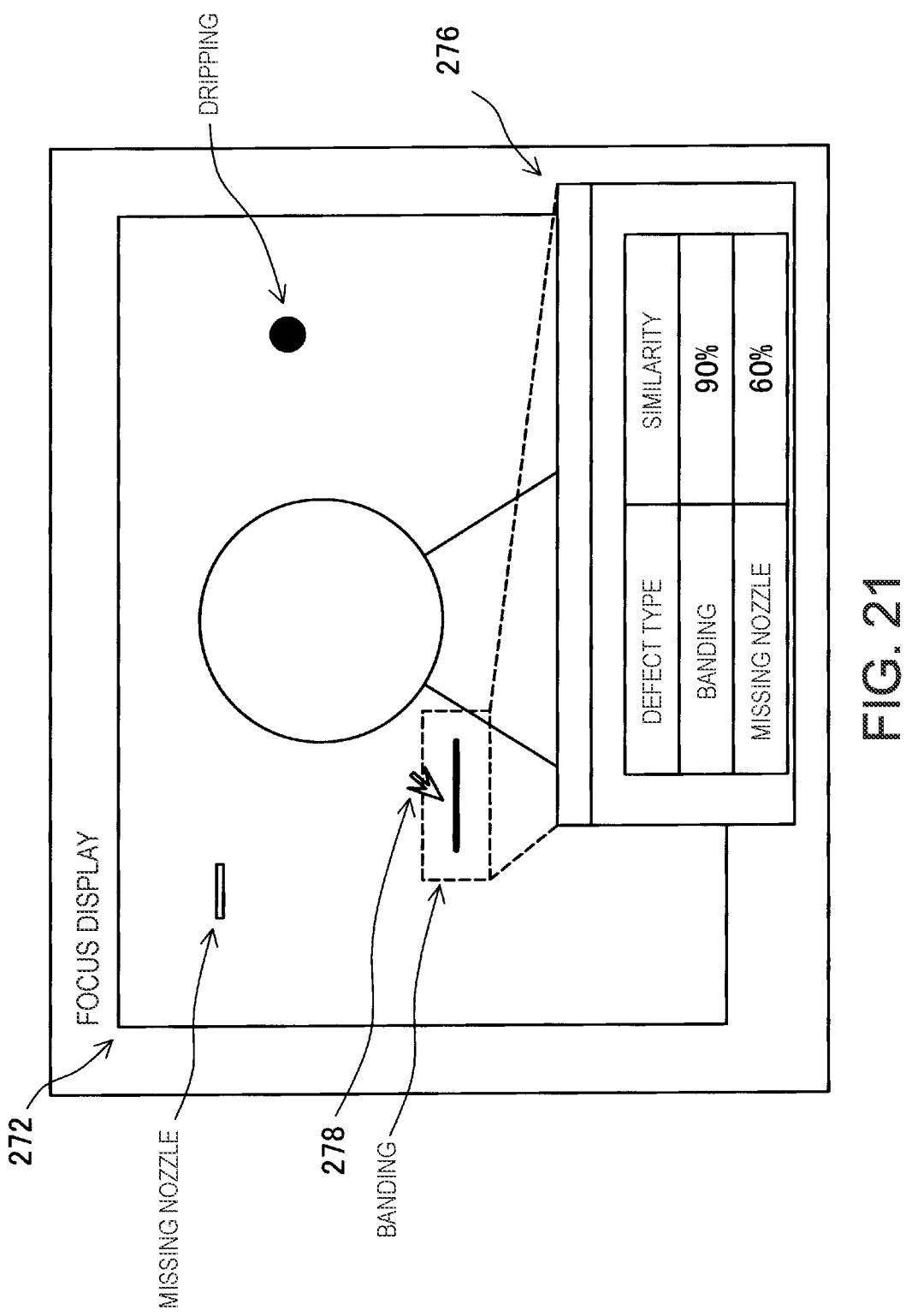
FIG. 21 is an explanatory diagram showing an example of performed a focus display with respect to the inspection image displayed on the display section by the inspection result display section.

FIG. 21 is an explanatory diagram showing an example of a focus display 276 performed with respect to the inspection image 272 that the inspection result display section 119 displays on the display section 21. In the focus display 276, the defect that has the highest similarity is picked up, and the picked up defect is displayed as a defect of interest. In addition, similarity determination results with respect to defect types other than the picked up defect, which were detected in the process of discriminating defects, are retained. When a defect that had its similarity determination results retained has a similarity of equal to or more than the threshold of the inspection result display section 119, then the similarity determination result for the defect type equal to or more than the threshold may be displayed. In the example illustrated in FIG. 21, the banding defect, which has a similarity of 90%, is displayed as the picked up defect with the highest similarity and the missing nozzle defect, which has a similarity of 60%, is displayed as a defect with a similarity of equal to or higher than the threshold value. In this way, sometimes a plurality of defect types may be included in one defect. By the inspection result display section 119 performing the focus display of defects, when a plurality of defect types is included in one defect, the plurality of defect types can be displayed. In the focus display, by pressing the key selected by the display switching key selection section 264 in FIG. 15, for example, the "Tab key", then focus display can be performed for the next defect type as the defect of interest. Also shown in FIG. 21 is a mouse pointer 278. When "mouse" is selected in the selection of the display switching key selection section 264 of FIG. 15, then the focus display 276 for the defect indicated by the mouse pointer 278 is performed. When selection is by the mouse pointer 278, focus display may be performed for the defect pointed to by the mouse pointer 278 when the click button of the mouse is clicked, or focus display may be performed when the mouse pointer 278 is moved over the defect.

In the inspection result display control screen 260 shown in FIG. 15, the display mode selected in the display method selection section 262 is common to the defect types, but display mode may be selected for each defect type.

As described above, according to the present embodiment, the information processing device 20, which functions as a defect discrimination device, includes the inspection result display section 119, which displays the detected defect in a mode according to the state of the defect, together with the defect type of the defect, as the display image corresponding to the inspection image. Therefore, it becomes easy to understand what kind of defect has occurred.

According to the present embodiment, the state of the defect may be any one of the defect type, the position of the defect, the size of the defect, the shape of the defect obtained from explanatory information, and the similarity to the defect type. The state of the defect can be easily obtained.

According to the present embodiment, the inspection result display section 119 displays a list of detected defects by defect type, and can set, for each defect type displayed in the list, whether the defects are to be displayed in the mode of the type according to the state of the defects, so that the defect type of the defect desired to be displayed can be displayed more intelligibly.

According to the present embodiment, since the inspection result display section 119 can set the display mode for each defect type, it is possible to know what kind of defect has occurred by the display mode.

According to the present embodiment, since the inspection result display section 119 displays the defect in the display mode that includes at least one of color coding, shading, inverting, blinking, and enclosing, it is possible to easily judge what kind of defect has occurred by the display mode of the defect.

According to the present embodiment, it is easy to detect the defect because the difference extraction section 115, which extracts the difference image of differences between the reference image and the inspection image, is provided and the defect detection section 120 detects defects by using the difference image.

It may include the learning/re-learning section 117, which is input with divided images generated by the image dividing section 116 and with a corrected image (to which was applied a correction process of generating a plurality of types of difference images from the difference image, which is for learning purposes and which corresponds to an erroneously determined defect or to an unknown defect discovered with respect in the divided images) and which learns the defect type. According to the defect discrimination device of this aspect, additional learning and reinforcement learning of defect types can be performed.

According to the present embodiment, the defect detection section 120 includes the similarity calculation section that uses the machine learning model, which was generated by associating defects with defect type, to deduce defects from the difference image of differences between the reference image and the inspection image, and that calculates the similarity with respect to the defect type. Therefore, the similarity of the defect type can be easily calculated.

B. Other Embodiments

The present disclosure is not limited to the embodiments described above, and can be realized in various aspects without departing from the spirit thereof. For example, the present disclosure can also be realized by the following aspects. The technical features in the above described embodiments corresponding to the technical features in each aspect described below can be appropriately replaced or combined in order to solve a part or all of the problems of the present disclosure or to achieve a part or all of the effects of the present disclosure. In addition, unless the technical features are described as essential features in the present specification, the technical features can be appropriately deleted.

(1) According to an aspect of the present disclosure, a defect discrimination device for a printed image includes an inspection image acquisition section configured to acquire an inspection image by imaging a print medium on which an image is printed, the image corresponding to a reference image that becomes a reference of an image in which a defect is to be detected; a defect detection section configured to detect a state of the defect, the state including a defect type of the defect included in the printed inspection image; and an inspection result display section configured to display the detected defect together with the defect type of the defect, in a display mode according to the state of the defect.

According to the defect discrimination device of this aspect, it is possible to intelligibly display what kind of defect has occurred.

(2) The defect discrimination device according to above aspect may have the following configuration, the defect detection section is configured to specify the state of the defect and a position of the defect on the inspection image, the inspection result display section is configured to display the defect at a position corresponding to the position where the defect is specified on the inspection image.

According to the defect discrimination device of this aspect, it is possible to intelligibly display what kind of defect has occurred at which position.

(3) The defect discrimination device according to the above aspect may have the following configuration, the state of the defect includes at least one of the defect type, the position of the defect, the size of the defect, the shape of the defect, and a similarity to the defect type.

According to the defect discrimination device of this aspect, the state of the defect can be easily obtained.

(4) The defect discrimination device according to above aspect may have the following configuration, the inspection result display section is configured to display the defect in the display mode that includes at least one of color coding, shading, inverting, blinking, and enclosing.

According to the defect discrimination device of this aspect, it is possible to easily judge what kind of defect has occurred by the display mode of the defect.

(5) The defect discrimination device according to above aspect may have the following configuration, the inspection result display section is configured to display using a plurality of types of display methods as the display mode, display the detected defects in a list according to the defect type, and set, for each defect type displayed in the list, whether or not to make each defect type a target of display by mode of a type corresponding to the state of the defect.

According to the defect discrimination device of this aspect, it is possible to intelligibly display the defect type of the defect desired to be displayed.

(6) The defect discrimination device according to above aspect may have the following configuration, the inspection result display section is configured to set the display mode for each defect type.

According to the defect discrimination device of this aspect, it is possible to understand what kind of defect has occurred by the display mode.

(7) The defect discrimination device according to above aspect may further includes the following configuration, a difference extraction section configured to extract a difference image of differences between the reference image and the inspection image, wherein the defect detection section is configured to detect the defect using the difference image.

According to the defect discrimination device of this aspect, since the difference image is used, the defect is easily detected.

(8) The defect discrimination device according to above aspect may have the following configuration, the defect detection section includes a similarity calculation section that uses a machine learning model generated as training data by associating defects with the defect image, to deduce defects from the difference image of differences between the reference image and the inspection image, and that calculates similarity with respect to the defect type.

According to the defect discrimination device of this aspect, it is possible to intelligibly display what kind of defect has occurred.

(9) A defect discrimination method for printed image according to the present disclosure includes step of acquiring an inspection image by imaging a print medium on which an image is printed, the image corresponding to a reference image that becomes a reference of an image in which a defect is to be detected; step of detecting a state of the defect, the state including a defect type of the defect included in the printed inspection image; and step of displaying the detected defect together with the defect type of the defect, in a display mode according to the state of the defect.

According to the defect discrimination method of this aspect, it become to intelligibly understand what kind of defect has occurred at which position.

In the above described embodiments, a part of the configuration realized by hardware may be replaced with software. At least a part of the configuration realized by software can also be realized by a discrete circuit configuration. In a case where a part or all of the functions of the present disclosure are realized by software, the software (computer program) can be provided in a form stored in a computer-readable recording medium. "Computer-readable recording medium" is not limited to a portable recording medium such as a flexible disk or a CD-ROM, and includes an internal storage device in a computer such as various RAMS or ROMs, and an external storage device fixed to a computer such as a hard disk. In other words, "computer readable-recording medium" has a broad meaning that includes any recording medium in which a data packets can be fixed rather than temporary.

What is claimed is:

1. A defect discrimination device for a printed image, comprising:

an inspection image acquisition section configured to acquire an inspection image by imaging a print medium on which an image is printed, the image corresponding to a reference image that becomes a reference of an image in which a defect is to be detected;

a defect detection section configured to detect a state of the defect, the state including a defect type of the defect included in the printed inspection image; and an inspection result display section configured to display the detected defect together with the defect type of the defect, in a display mode according to the state of the defect, wherein the inspection result display section is configured to display using a plurality of types of display methods as the display mode, display the detected defects in a list according to the defect type, and set, for each defect type displayed in the list, whether or not to make each defect type a target of display by mode of a type corresponding to the state of the defect.

2. The defect discrimination device according to claim 1, wherein the defect detection section is configured to specify the state of the defect and a position of the defect on the inspection image and the inspection result display section is configured to display the defect at a position corresponding to the position where the defect is specified on the inspection image.

3. The defect discrimination device according to claim 1, wherein the state of the defect includes at least one of the defect type, the position of the defect, the size of the defect, the shape of the defect, and a similarity to the defect type.

4. The defect discrimination device according to claim 1, wherein the inspection result display section is configured to display the defect in the display mode that includes at least one of color coding, shading, inverting, blinking, and enclosing.

5. The defect discrimination device according to claim 1, wherein the inspection result display section is configured to set the display mode for each defect type.

6. The defect discrimination device according to claim 1, wherein the defect detection section includes a similarity calculation section that uses a machine learning model generated as training data by associating defects with the defect image, to deduce defects from the difference image of differences between the reference image and the inspection image, and that calculates similarity with respect to the defect type.

7. A defect discrimination method for printed image, comprising:

a step of acquiring an inspection image by imaging a print medium on which an image is printed, the image corresponding to a reference image that becomes a reference of an image in which a defect is to be detected;

a step of detecting a state of the defect, the state including a defect type of the defect included in the printed inspection image; and a step of displaying the detected defect together with the defect type of the defect, in a display mode according to the state of the defect, wherein the step of displaying the detected defect includes display using a plurality of types of display methods as the display mode, display the detected defects in a list according to the defect type, and set, for each defect type displayed in the list, whether or not to make each defect type a target of display by mode of a type corresponding to the state of the defect.

* * * * *